United States Patent
Wang et al.

(10) Patent No.: US 7,663,708 B2
(45) Date of Patent: Feb. 16, 2010

(54) MULTI-DOMAIN LIQUID CRYSTAL DISPLAY

(75) Inventors: Wen-Chun Wang, Tai Chung (TW);
Chin-Chang Liu, Feng Yuan (TW);
Yi-Chun Wu, Hua Lien (TW);
Hsi-Rong Han, Wu Jih Hsiang (TW)

(73) Assignee: Wintek Corporation, Taichung (TW)

(*) Notice: Subject to any disclaimer, the term of this patent is extended or adjusted under 35 U.S.C. 154(b) by 783 days.

(21) Appl. No.: 11/453,061

(22) Filed: Jun. 15, 2006

(65) Prior Publication Data
US 2007/0229430 A1 Oct. 4, 2007

(30) Foreign Application Priority Data
Mar. 31, 2006 (TW) .............................. 95111585 A

(51) Int. Cl.
*G02F 1/1343* (2006.01)
*G02F 1/137* (2006.01)

(52) U.S. Cl. ........................................ 349/37; 349/141

(58) Field of Classification Search ................... 349/37, 349/141
See application file for complete search history.

(56) References Cited

U.S. PATENT DOCUMENTS

| | | | |
|---|---|---|---|
| 6,678,027 B2 | 1/2004 | Park et al. | |
| 6,724,452 B1 | 4/2004 | Takeda et al. | |
| 6,839,104 B2 | 1/2005 | Taniguchi et al. | |
| 7,443,372 B2 * | 10/2008 | Lee et al. | ....................... 345/96 |
| 2004/0201807 A1 | 10/2004 | Ong | |

* cited by examiner

*Primary Examiner*—Jerry T Rahll
(74) *Attorney, Agent, or Firm*—Muncy, Geissle, Olds & Lowe, PLLC

(57) ABSTRACT

A multi-domain liquid crystal display includes a plurality of first and second picture elements and a plurality of first and second auxiliary electrodes. The first and second picture elements have opposite polarities under the same frame of an inversion drive scheme. The first auxiliary electrodes are connected to the first picture elements and at least partially surround each of the second picture elements, and the second auxiliary electrodes are connected to the second picture elements and at least partially surround each of the first picture elements.

36 Claims, 29 Drawing Sheets

Frame N column

| row | 1 | 2 | 3 | 4 | 5 |
|---|---|---|---|---|---|
| 1 | + | − | + | − | + |
| 2 | − | + | − | + | − |
| 3 | + | − | + | − | + |
| 4 | − | + | − | + | − |
| 5 | + | − | + | − | + |

Frame N+1 column

| row | 1 | 2 | 3 | 4 | 5 |
|---|---|---|---|---|---|
| 1 | − | + | − | + | − |
| 2 | + | − | + | − | + |
| 3 | − | + | − | + | − |
| 4 | + | − | + | − | + |
| 5 | − | + | − | + | − |

FIG. 5A

Frame N column

| row | 1 | 2 | 3 | 4 | 5 |
|---|---|---|---|---|---|
| 1 | + | − | + | − | + |
| 2 | + | − | + | − | + |
| 3 | + | − | + | − | + |
| 4 | + | − | + | − | + |
| 5 | + | − | + | − | + |

Frame N+1 column

| row | 1 | 2 | 3 | 4 | 5 |
|---|---|---|---|---|---|
| 1 | − | + | − | + | − |
| 2 | − | + | − | + | − |
| 3 | − | + | − | + | − |
| 4 | − | + | − | + | − |
| 5 | − | + | − | + | − |

FIG. 5B

Frame N column

| row | 1 | 2 | 3 | 4 | 5 |
|---|---|---|---|---|---|
| 1 | + | + | + | + | + |
| 2 | − | − | − | − | − |
| 3 | + | + | + | + | + |
| 4 | − | − | − | − | − |
| 5 | + | + | + | + | + |

Frame N+1 column

| row | 1 | 2 | 3 | 4 | 5 |
|---|---|---|---|---|---|
| 1 | − | − | − | − | − |
| 2 | + | + | + | + | + |
| 3 | − | − | − | − | − |
| 4 | + | + | + | + | + |
| 5 | − | − | − | − | − |

FIG. 5C

MULTI-DOMAIN LIQUID CRYSTAL DISPLAY

BACKGROUND OF THE INVENTION (a) Field of the Invention

The invention relates to a multi-domain liquid crystal display, particular to a multi-domain liquid crystal display where fringe fields are produced by means of a polarity inversion control.

(b) Description of the Related Art

Typically, the display contrast and response speed offered by a VA (vertically-aligned) mode liquid crystal display, which uses a negative liquid crystal material and vertical alignment film, are better compared with a TN (twisted-nematic) mode LCD, since liquid crystal molecules are aligned in a vertical direction when no voltage is applied. Also, it is known the viewing angle performance of a VA mode LCD is improved by setting the orientation directions of the liquid crystal molecules inside pixels to a plurality of mutually different directions; that is, forming multiple independent domains in the liquid crystal display.

FIG. 1A shows a schematic diagram illustrating a conventional design of a multi-domain vertically-aligned liquid crystal display (MVA LCD). Referring to FIG. 1A, a top substrate 102 and a bottom substrate 104 are both provided with protrusions 106 having different inclined surfaces and covered by vertical alignment films 108. Hence, the liquid crystal molecules near the inclined surfaces orientate vertically to the inclined surfaces to have different degrees of pre-tilt angles. In case the pre-tilt liquid crystal molecules exist, surrounding liquid crystal molecules are tilted in the directions of the pre-tilt liquid crystal molecules when a voltage is applied. Thus, multiple domains each having individual orientation direction of liquid crystal molecules are formed. Besides, the domain-regulating structure for providing inclined surfaces includes, but is not limited to, the protrusions 106, and other structure such as a concavity structure 114 shown in FIG. 1B may also be used.

However, when one compares the transmission path of light I1 and that of light I2 shown both in FIGS. 1A and 1B, it is clearly found the pre-tilt liquid crystal molecules through which the light I2 passes under a field-off state may result in surplus phase differences (.nd.0) to cause light leakage. Accordingly, additional compensation films must be provided to eliminate the light leakage.

FIG. 2 shows a schematic diagram illustrating another conventional design of a MVA LCD. Referring to FIG. 2, the transparent electrode 204 on the substrate 202 is provided with openings 206. Due to the fringe fields at the edges of transparent electrode 204 and at each opening 206, the liquid crystal molecules are tilted toward the center of each opening 206 to result in a multi-domain LCD cell. However, the strength of the fringe fields generated by the formation of the openings 206 is often insufficient, particularly when the widths and the intervals of the openings 206 are not optimized. Besides, since the azimuth in which the liquid crystal molecules tilt due to fringe fields includes all directions of 360 degrees, a disclination region 210 often appears beyond the openings 206 or between two adjacent openings to result in a reduced light transmittance.

BRIEF SUMMARY OF THE INVENTION

Hence, an object of the invention is to provide a multi-domain liquid crystal display that allows for solving the problems of conventional designs as mentioned above.

According to the invention, a multi-domain liquid crystal display includes a plurality of first and second picture elements and a plurality of first and second auxiliary electrodes. The first and second picture elements have opposite polarities under the same frame of an inversion drive scheme. The first auxiliary electrodes are connected to the first picture elements and at least partially surround each of the second picture elements, and the second auxiliary electrodes are connected to the second picture elements and at least partially surround each of the first picture elements.

Through the design of the invention, since the auxiliary electrode with pre-set distribution is provided to cooperate with an polarity inversion drive scheme, the auxiliary electrode and a pixel electrode it surrounds will have opposite polarities to produce fringe fields, so that the orientations of liquid crystal molecules within one picture element are divided into different tilt directions to obtain a multi-domain profile of a liquid crystal cell. Thus, compared with the conventional design where a protrusion or concavity structure is used to cause pre-tilt liquid crystal molecules, the surplus phase difference is eliminated to avoid light leakage according to the invention. Further, compared with another conventional design where openings are formed to produce fringe fields, the opposite polarities between the auxiliary electrode and the pixel electrode allow for stronger field strength to tilt liquid crystal molecules so as to reduce the areas of a disclination region and further increase the light-transmittance of a LCD.

BRIEF DESCRIPTION OF THE DRAWINGS

FIGS. 5A-5C show schematic diagrams respectively illustrating a dot inversion, a column inversion, and a row inversion polarity patterns of a liquid crystal display under a polarity inversion drive scheme.

DETAILED DESCRIPTION OF THE INVENTION

Figure 1A:
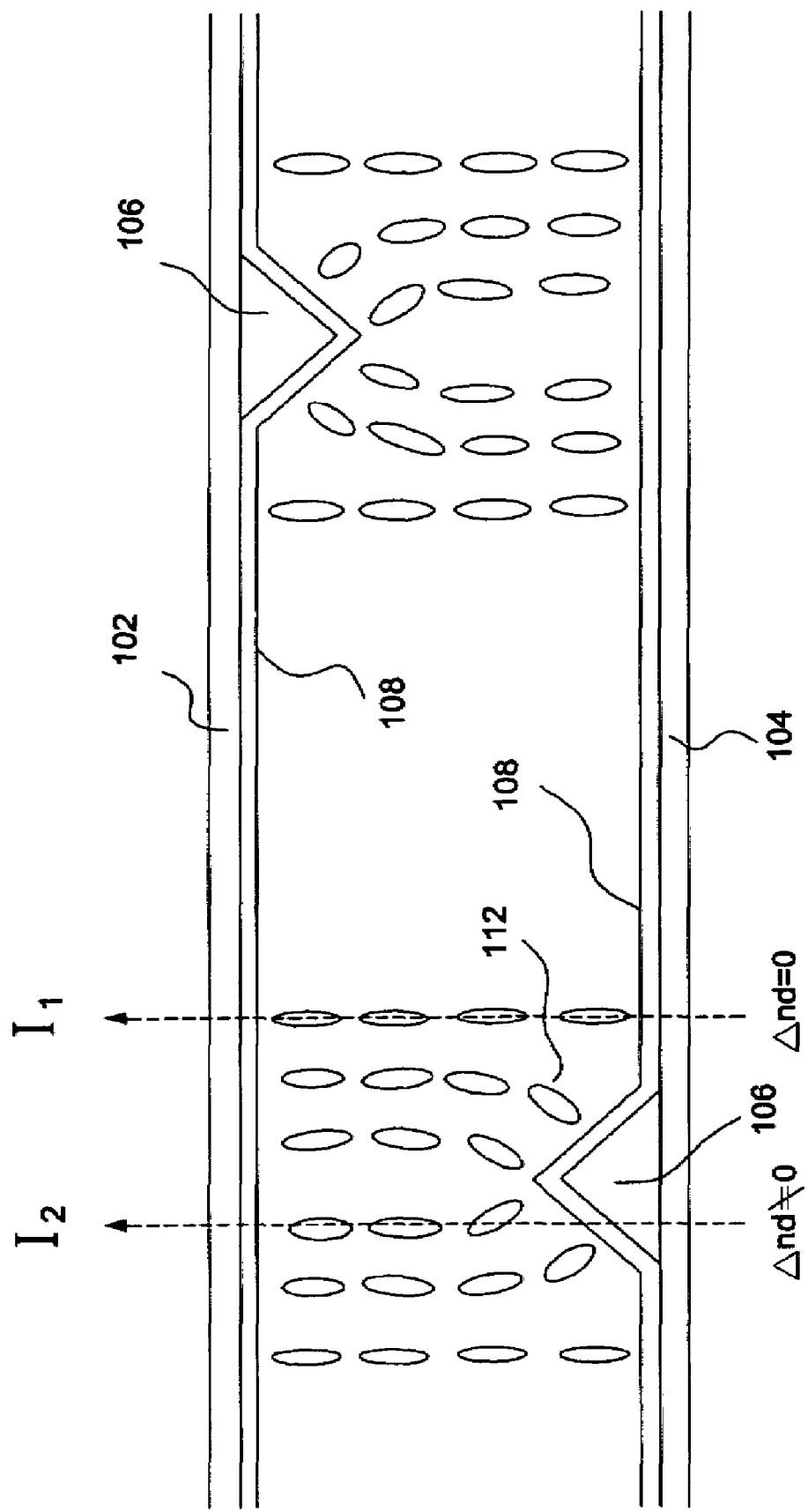
FIG. 1A shows a schematic diagram illustrating a conventional design of a multi-domain vertically-aligned liquid crystal display.
Figure 1B:
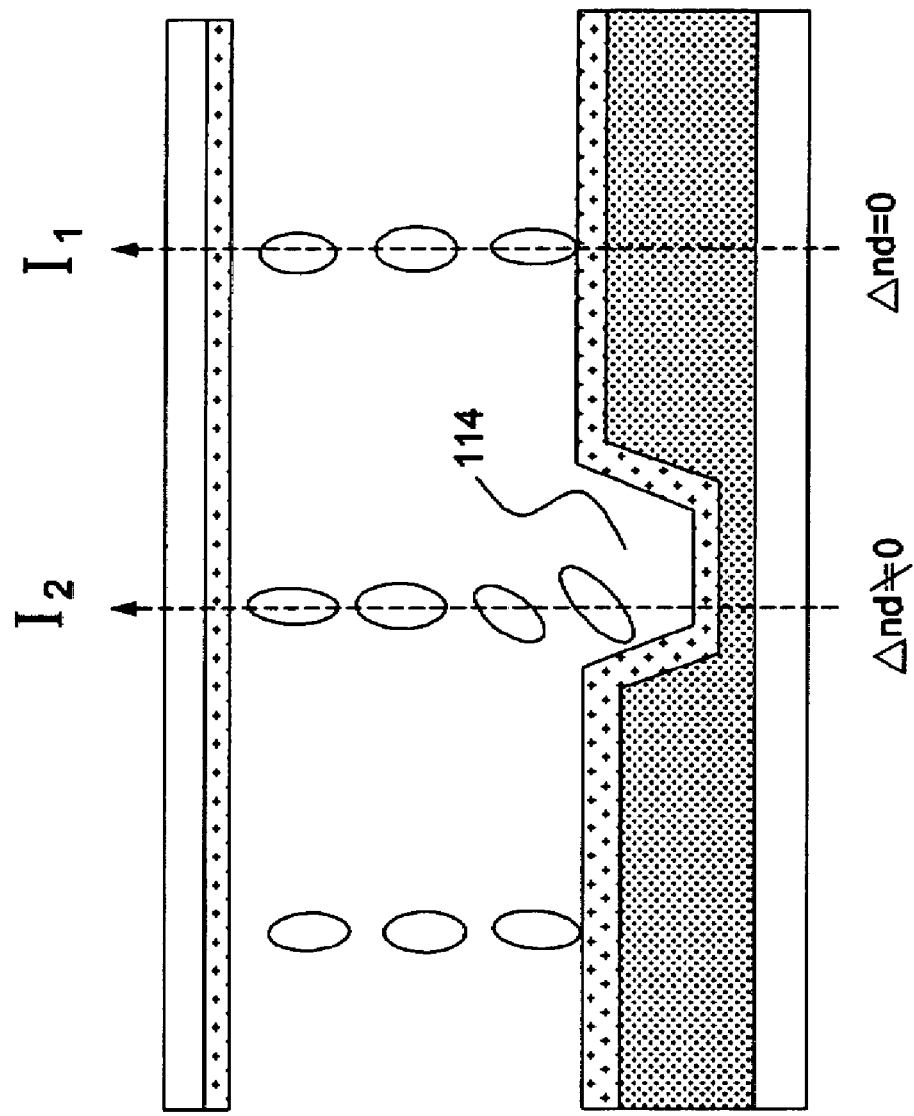
FIG. 1B shows a schematic diagram illustrating a conventional design of a multi-domain vertically-aligned liquid crystal display.
Figure 2:
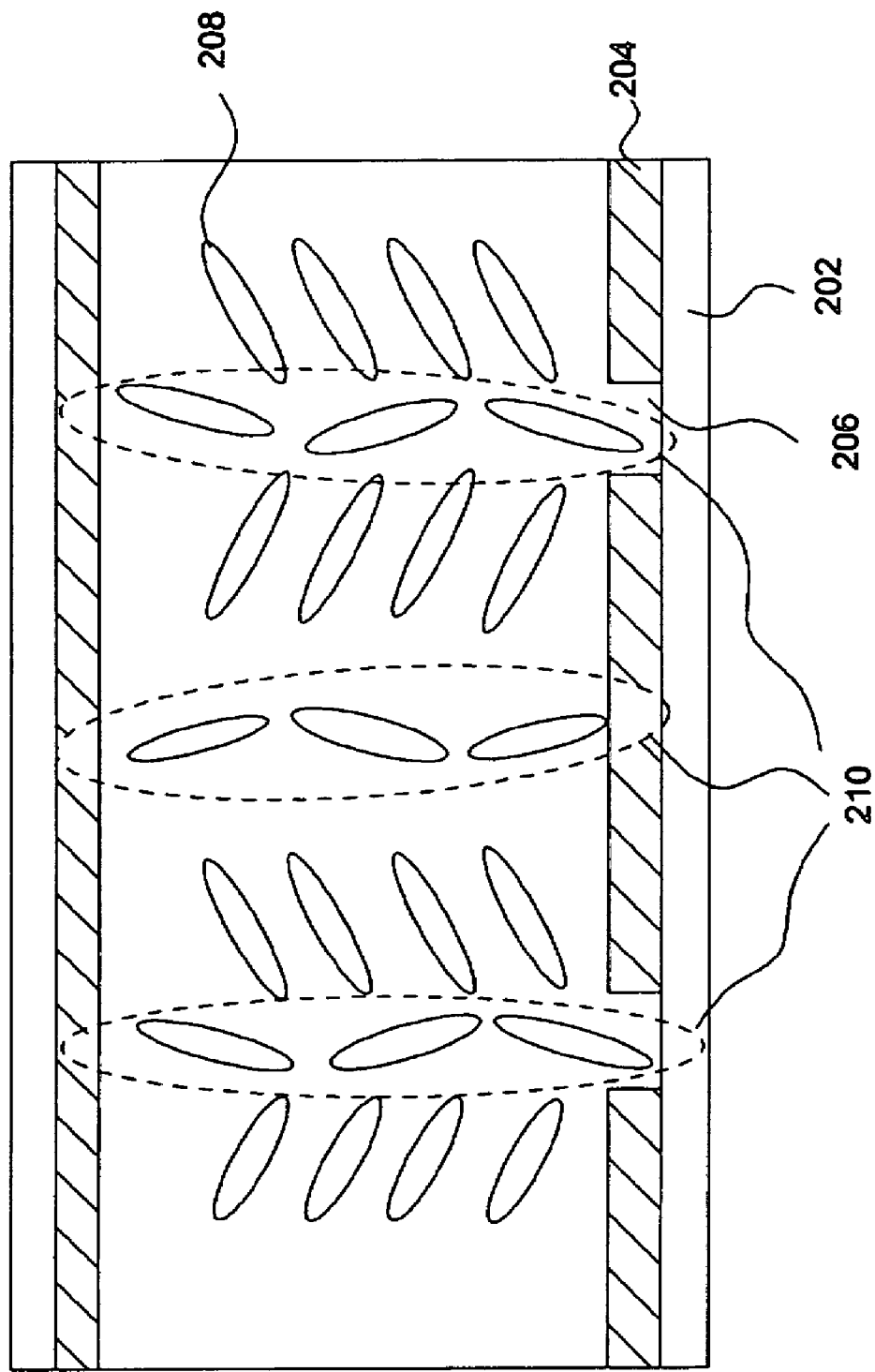
FIG. 2 shows a schematic diagram illustrating a conventional design of a multi-domain vertically-aligned liquid crystal display.
Figure 3:
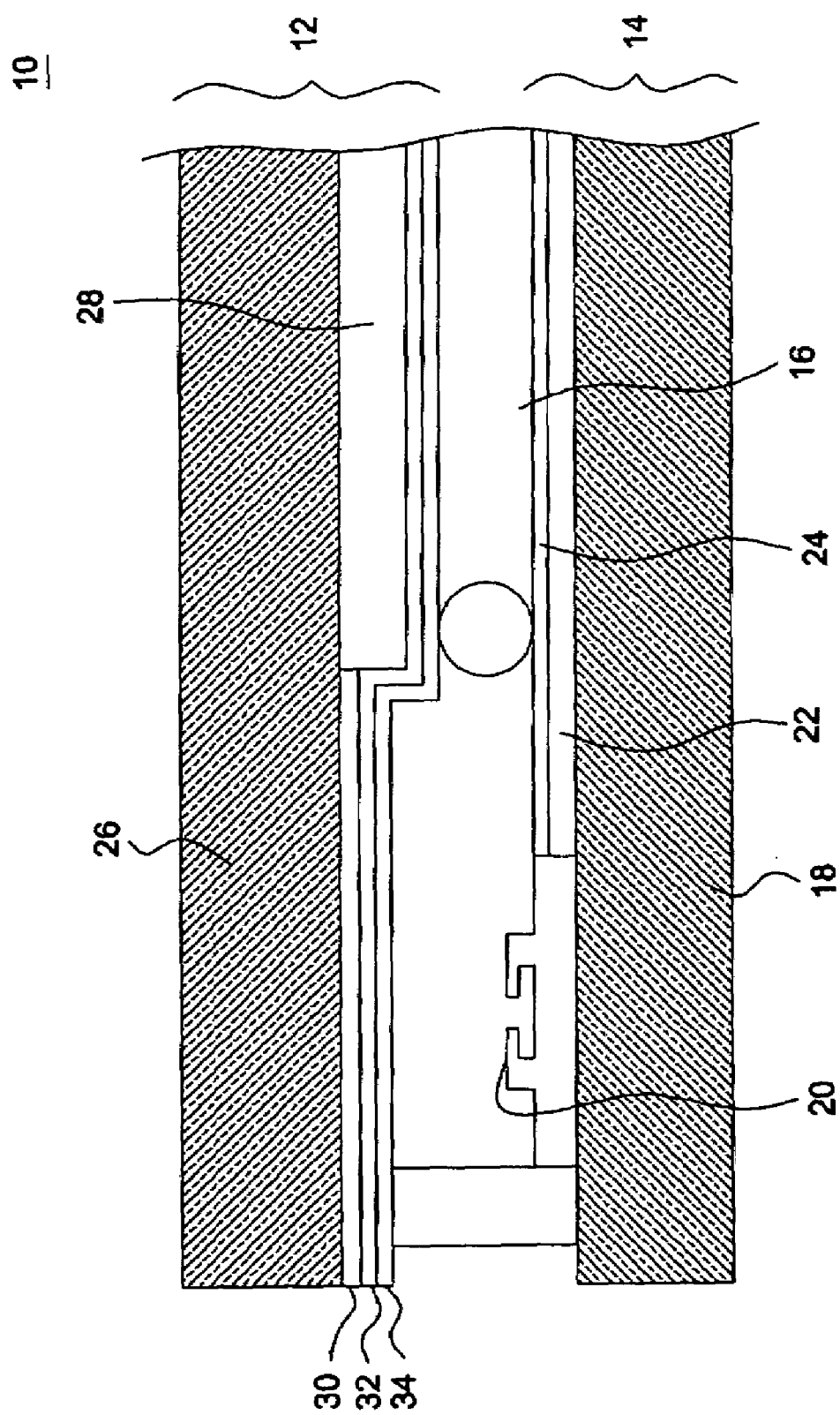
FIG. 3 shows a cross-section illustrating a multi-domain liquid crystal display according to an embodiment of the invention.

FIG. 3 shows a cross-section illustrating a multi-domain liquid crystal display according to an embodiment of the invention. Referring to FIG. 3, the multi-domain liquid crystal display 10 includes a color filter substrate 12 and an array substrate 14, with a liquid crystal layer 16 interposed between them. The liquid crystal layer 16 is made from a liquid crystal material having negative dielectric anisotropy, where the liquid crystal molecules are vertically-aligned without being applied with a voltage. Further, a chiral dopant may be added to the liquid crystal layer to adjust the twist pitch to a desired value so as to reduce the areas of a disclination region. In the array substrate 14, a switching device 20 such as a thin film transistor (TFT), a pixel electrode 22, and a first alignment layer 24 are formed on a transparent substrate 18. Further, in the color filter substrate 12, a color filter 28, a black matrix layer 30, a common electrode 32, and a second alignment layer 34 are formed on a transparent substrate 26.

Figure 4:
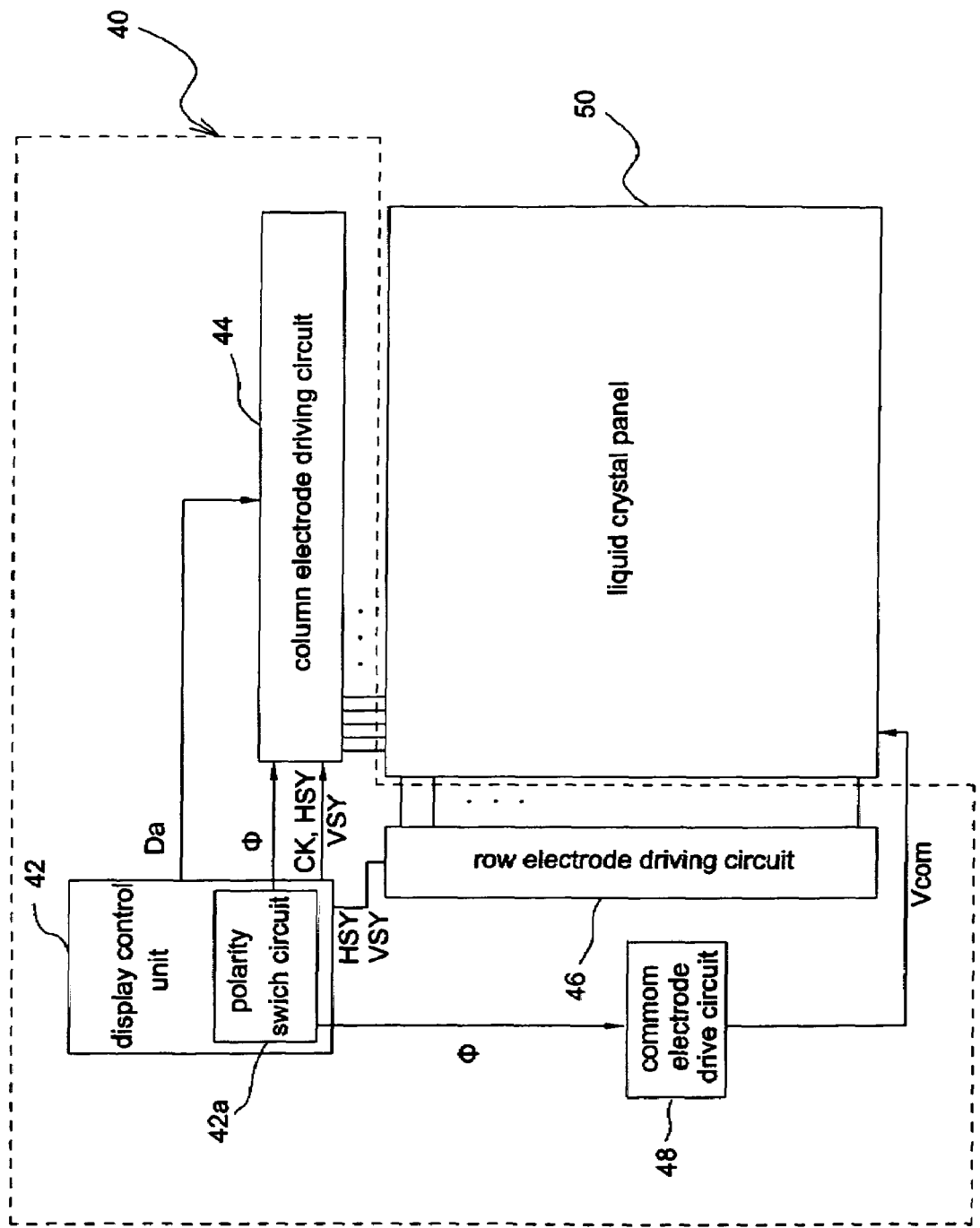
FIG. 4 shows a schematic diagram illustrating a drive circuitry for typical polarity inversion control in a liquid crystal display.

FIG. 4 shows a schematic diagram illustrating a drive circuitry 40 for typical polarity inversion control in a liquid crystal display. Referring to FIG. 4, a display control circuit 42 generates display clock signals CK, horizontal synchronizing signals HSY, vertical synchronizing signals VSY and digital image data Da, which are supplied to a column electrode driving circuit 44 and a row electrode driving circuit 46. Also, the drive circuitry 40 includes a polarity switch circuit 42a that inverts polarities of data signals (i.e., positive-negative polarity of the electric voltage to be applied to the liquid crystal panel 50) through a polarity control signals according to the horizontal synchronizing signals HSY and the vertical synchronizing signals VSY. Further, a common electrode drive circuit 48 provides the common electrode 32 of the liquid crystal panel 50 with a common voltage Vcom.

FIGS. 5A-5C show schematic diagrams respectively illustrating a dot inversion, a column inversion, and a row inversion polarity patterns of a liquid crystal display under a polarity inversion drive scheme. From these figures, it is found positive-polarity picture elements and negative-polarity picture elements are alternate with each other in the horizontal direction (row direction) and/or vertical direction (column direction) under the same frame of the polarity inversion drive scheme.

Figure 6A:
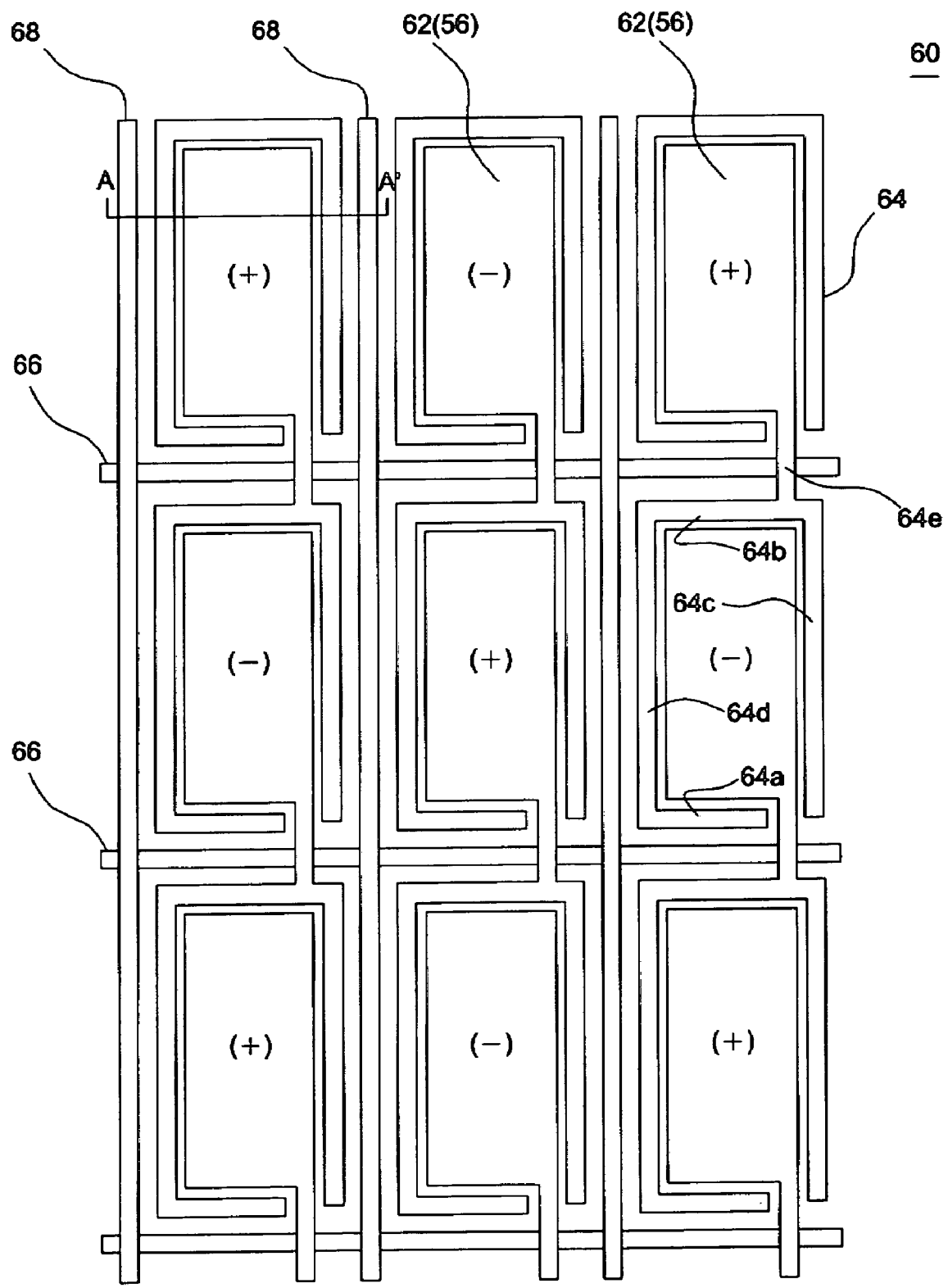
FIGS. 6A and 6B show schematic diagrams illustrating an embodiment of a multi-domain liquid crystal play according to the invention
Figure 6B:
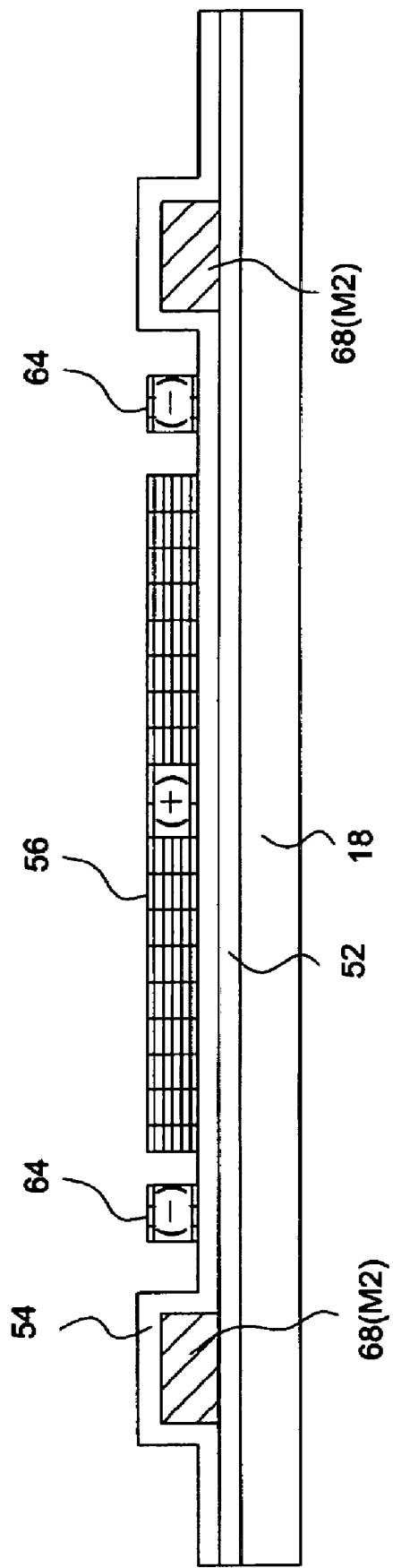

FIGS. 6A and 6B show schematic diagrams illustrating an embodiment of a multi-domain liquid crystal play according to the invention, where FIG. 6A is a top view observed from the normal direction of an array substrate, and FIG. 6B is a cross-section taken along A-A' line in FIG. 6A.

Referring to FIG. 6A, a plurality of picture elements that constitute the multi-domain liquid crystal play 60 are shown. Herein, the term "picture element" indicates an individual addressable display unit such as a red (R), green (G), or blue (B) sub-pixel of a color LCD. In the array substrate 14 as shown in FIG. 3, a plurality of scan lines 66 are arranged in a first direction, and a plurality of data lines 68 are arranged in a second direction perpendicular to the first direction, with each two scan lines 66 intersected with each two data lines 68 to define a distribution area of a picture element on the array substrate 14. In FIG. 6A, the picture elements 62 are arranged both in the vertical direction (column direction) and the horizontal direction (row direction) to form a picture element array. FIG. 6A also illustrates a polarity pattern under the same frame of a polarity inversion drive scheme, where symbols (+) indicate positive-polarity picture elements 62 and symbols (-) indicate negative-polarity picture elements 62. Since a dot-inversion drive scheme is applied in this embodiment, the positive-polarity picture elements and negative-polarity picture elements 62 alternate with each other both in the column direction and the row direction of the picture element array.

According to the invention, a picture element 62 and an auxiliary electrode 64 are formed in the distribution area defined by each two adjacent scan lines and data lines. The auxiliary electrode 64 at least partially surrounds the picture element 62 and has a polarity opposite to that of the picture element 62 it surrounds. For example, as shown in FIG. 6A, an auxiliary electrode 64 includes a surrounding part (strip-shape sections 64a-64d) and a connection part (strip-shape section 64e). The strip-shape sections 64a and 64b extending parallel to the scan lines (along the row direction) are positioned next to two opposite sides of a picture element, while the strip-shape sections 64c and 64d extending parallel to the data lines (along the column direction) are positioned next to other two opposite sides of the picture element 62. The strip-shape section 64e vertically extends to connect the auxiliary electrode 64 with another picture element 62 adjacent to the picture element 62 the auxiliary electrode 64 surrounds. Hence, through such design, a picture element 62 and its surrounding auxiliary electrode 64 will have opposite polarities since each two adjacent picture elements intrinsically have opposite polarities in a dot-inversion polarity pattern.

As shown in FIG. 6B, a dielectric gate insulation layer 52 is formed on a transparent substrate 18, and a metal 2 layer M2 on which data lines 68 are defined is deposited on the gate insulation layer 52. A dielectric passivation layer 54 is formed on the gate insulation layer 52 and covers data lines 68, and a pixel electrode 56 patterned from transparent conductive films is formed on the passivation layer 54. Also, the auxiliary electrode 64 is formed on the passivation layer 54 same as the pixel electrode 56, and is made from metallic materials or transparent conductive materials such as ITO and IZO. In addition, referring back to FIG. 6A, when the same transparent conductive films form the auxiliary electrodes 64 and the pixel electrodes 56, each of the auxiliary electrodes 64 is regarded as an extension part extending from each of its corresponding pixel electrodes 56. Each of the extension part has the same function as the pixel electrodes 56 and contributes to increase the aperture ratio.

Referring again to FIG. 6B, in the distribution area of a positive-polarity picture element 62, a negative-polarity auxiliary electrode 64 that is connected to another negative-polarity pixel electrode 56 surrounds the positive-polarity pixel electrode 56. The operation principle about how the opposite polarities between the auxiliary electrode and the pixel electrode induce fringe fields to tilt liquid crystal molecules is described below with reference to FIGS. 7A and 7B.

Figure 7A:
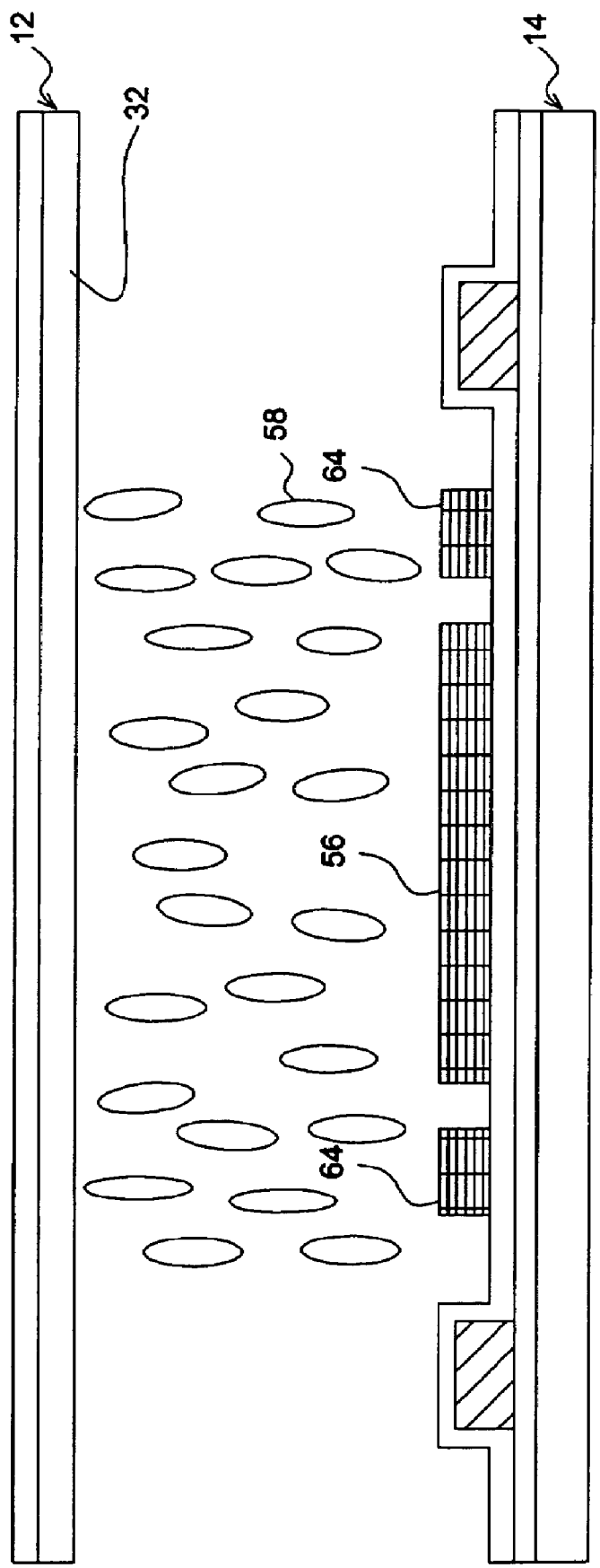
FIGS. 7A and 7B show schematic diagrams illustrating the operation principle according to the invention.
Figure 7B:
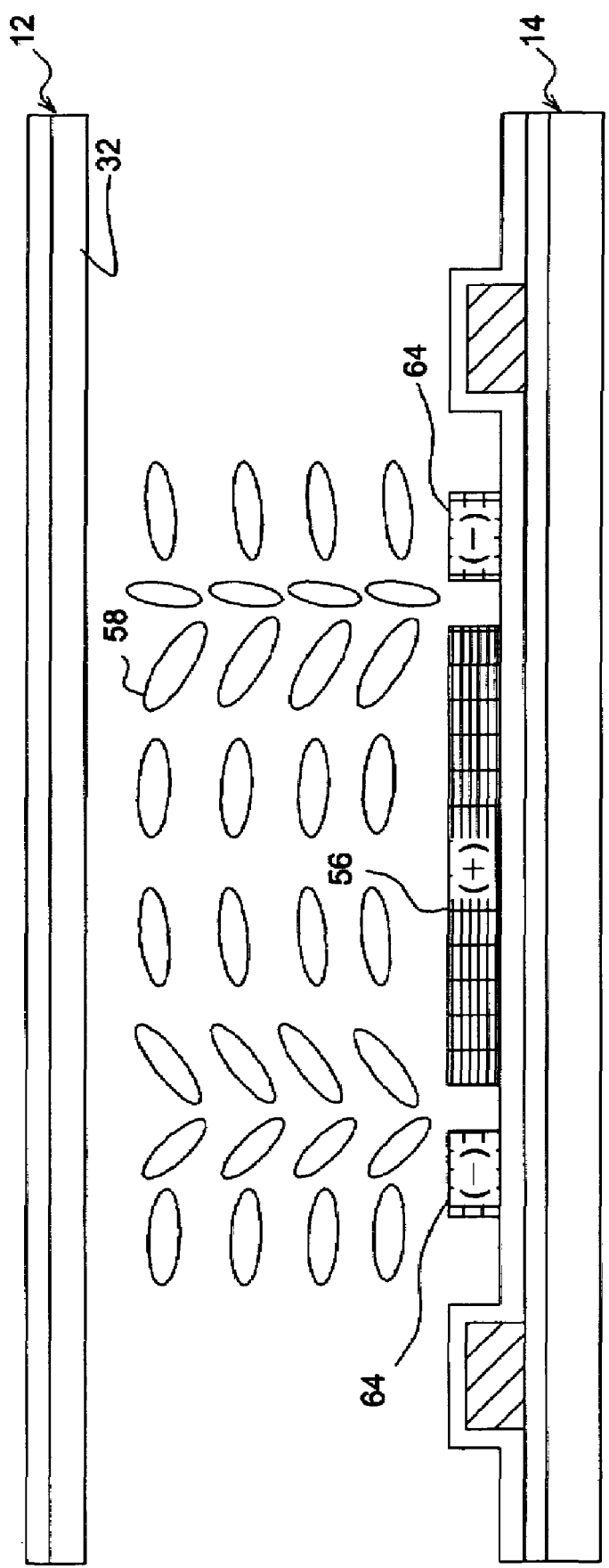

Referring to FIG. 7A, when no voltage is applied across a common electrode 32 and the pixel electrode 56, the liquid crystal molecules with negative dielectric anisotropy are naturally vertically-aligned. Then, when a voltage is applied across the common electrode 32 and the pixel electrode 56 for a period, fringe fields are produced at the edges of the positive-polarity pixel electrode 56 and the edges of its surrounding negative-polarity auxiliary electrode 64 to cause a slant electric filed due to their opposite polarities. Thus, the liquid crystal molecules are directed to a direction perpendicular to the slant electric filed. In that case, when the strip-shape sections 64a-64d of the auxiliary electrode 64 are positioned next to all the four sides of the pixel electrode 56, the orientations of liquid crystal molecules within one picture element are divided into four tilt directions to obtain a four-domain profile of a liquid crystal cell.

Through the design of the invention, since the auxiliary electrode 64 with pre-set distribution is provided to cooperate with an polarity inversion drive scheme, the auxiliary electrode 64 and a pixel electrode it surrounds will have opposite polarities to produce fringe fields, so that the orientations of liquid crystal molecules within one picture element are divided into different tilt directions to obtain a multi-domain profile of a liquid crystal cell. Thus, compared with the conventional design where a protrusion or concavity structure is used to cause pre-tilt liquid crystal molecules, the surplus phase difference is eliminated to avoid light leakage according to the invention. Further, compared with another conventional design where openings are formed to produce fringe fields, the opposite polarities between the auxiliary electrode 64 and the pixel electrode 56 allow for stronger field strength to tilt liquid crystal molecules so as to reduce the areas of a disclination region and further increase the light-transmittance of a LCD.

Figure 8:
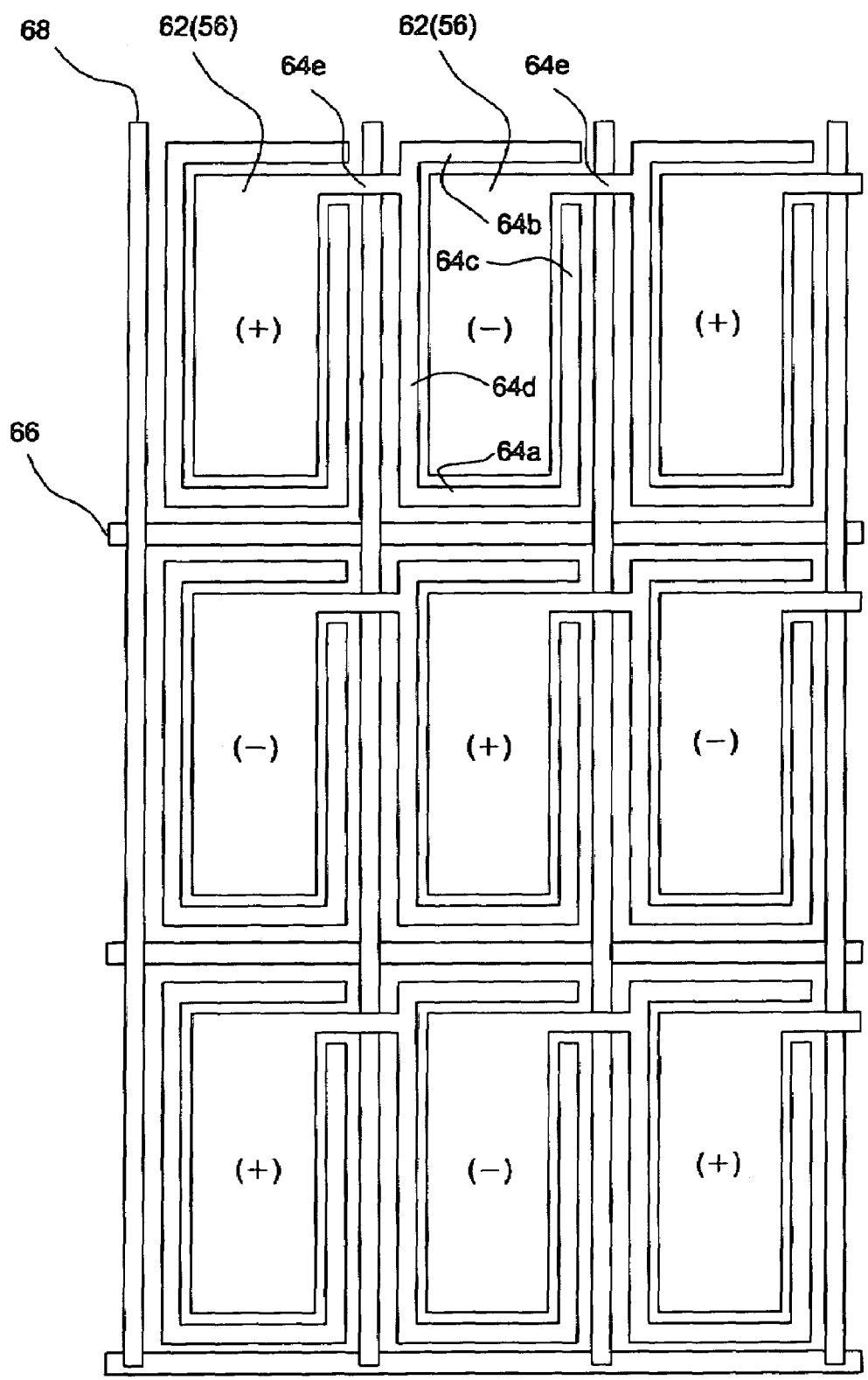
FIG. 8 shows a schematic diagram of a picture element array and a dot inversion polarity pattern illustrating another embodiment of the invention.

FIG. 8 shows a schematic diagram of a picture element array and a dot inversion polarity pattern illustrating another embodiment of the invention.

Referring to FIG. 8, in this embodiment, the auxiliary electrode 64 is horizontally connected to the pixel electrode 56 through its strip-shape section 64e. The strip-shape section 64e horizontally extends to connect the auxiliary electrode 64 with another pixel electrode 56 adjacent to the pixel electrode 56 that the auxiliary electrode 64 surrounds. Since positive-polarity picture elements and negative-polarity picture elements alternate with each other both in the column direction and the row direction in the dot inversion polarity pattern, the picture element 62 and its surrounding auxiliary electrode 64 will have opposite polarities.

Figure 9:
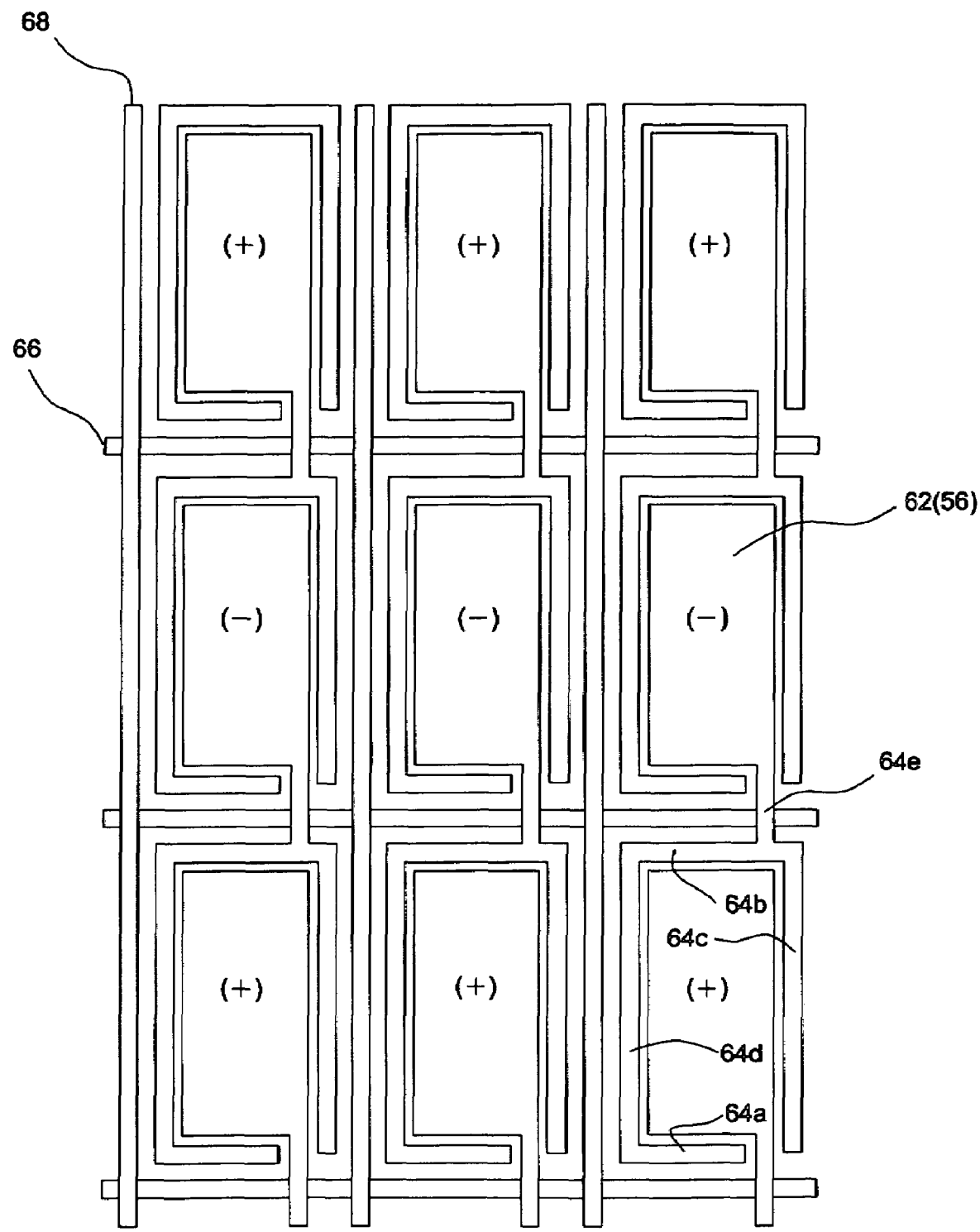
FIG. 9 shows a schematic diagram of a picture element array and a row inversion polarity pattern illustrating another embodiment of the invention.

FIG. 9 shows a schematic diagram of a picture element array and a row inversion polarity pattern illustrating another embodiment of the invention. Since positive-polarity picture elements and negative-polarity picture elements alternate with each other only in the column direction (vertical direction) in the row inversion polarity pattern, the auxiliary electrode 64 is vertically connected to another pixel electrode 56 adjacent to the pixel electrode 56 that the auxiliary electrode 64 surrounds to result in opposite polarities.

Figure 10:
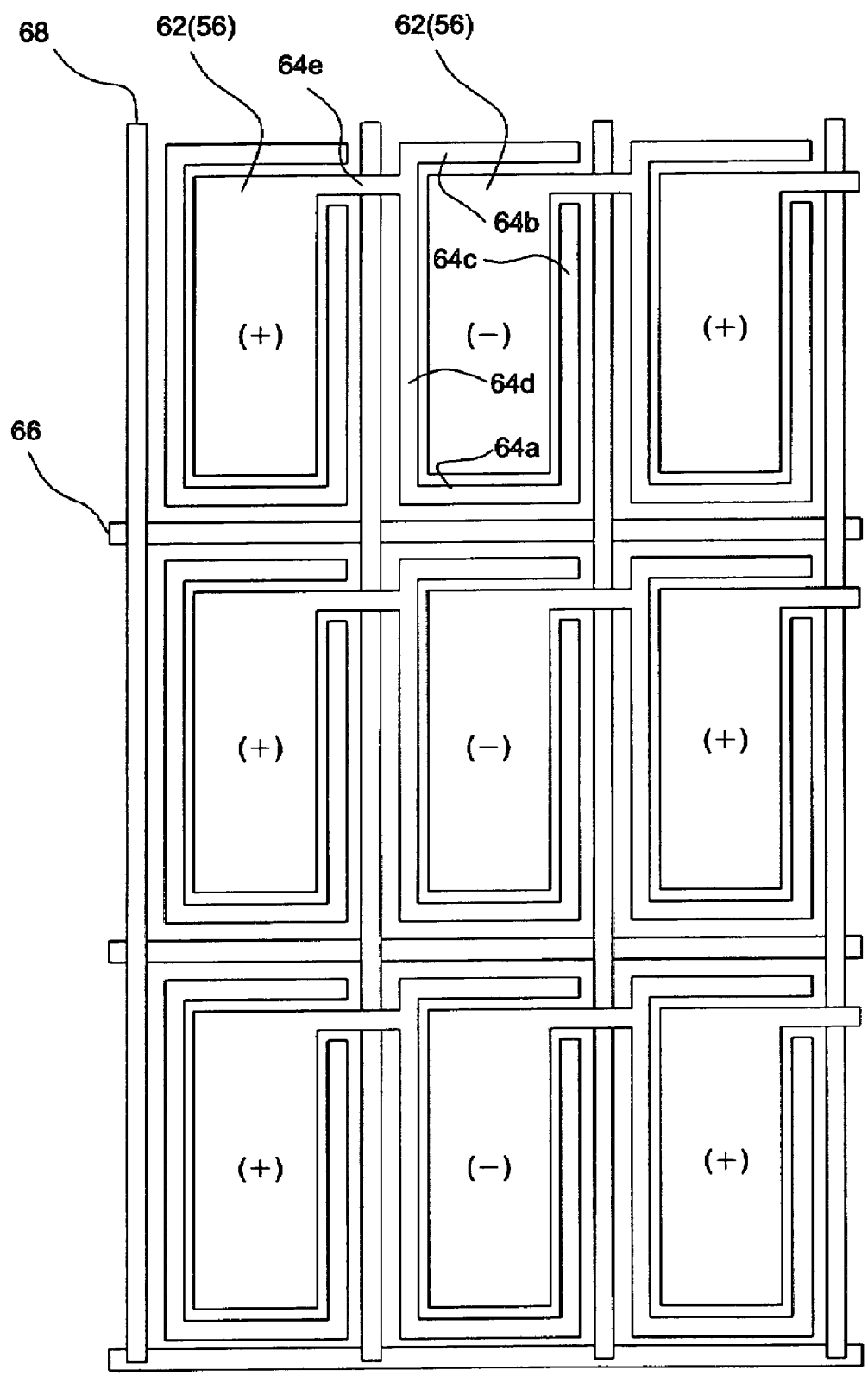
FIG. 10 shows a schematic diagram of a picture element array and a column inversion polarity pattern illustrating another embodiment of the invention.

FIG. 10 shows a schematic diagram of a picture element array and a column inversion polarity pattern illustrating another embodiment of the invention. Since positive-polarity picture elements and negative-polarity picture elements alternate with each other only in the row direction (horizontal direction) in the column inversion polarity pattern, the auxiliary electrode 64 is horizontally connected to another pixel electrode 56 adjacent to the pixel electrode 56 that the auxiliary electrode 64 surrounds to result in opposite polarities.

Figure 11:
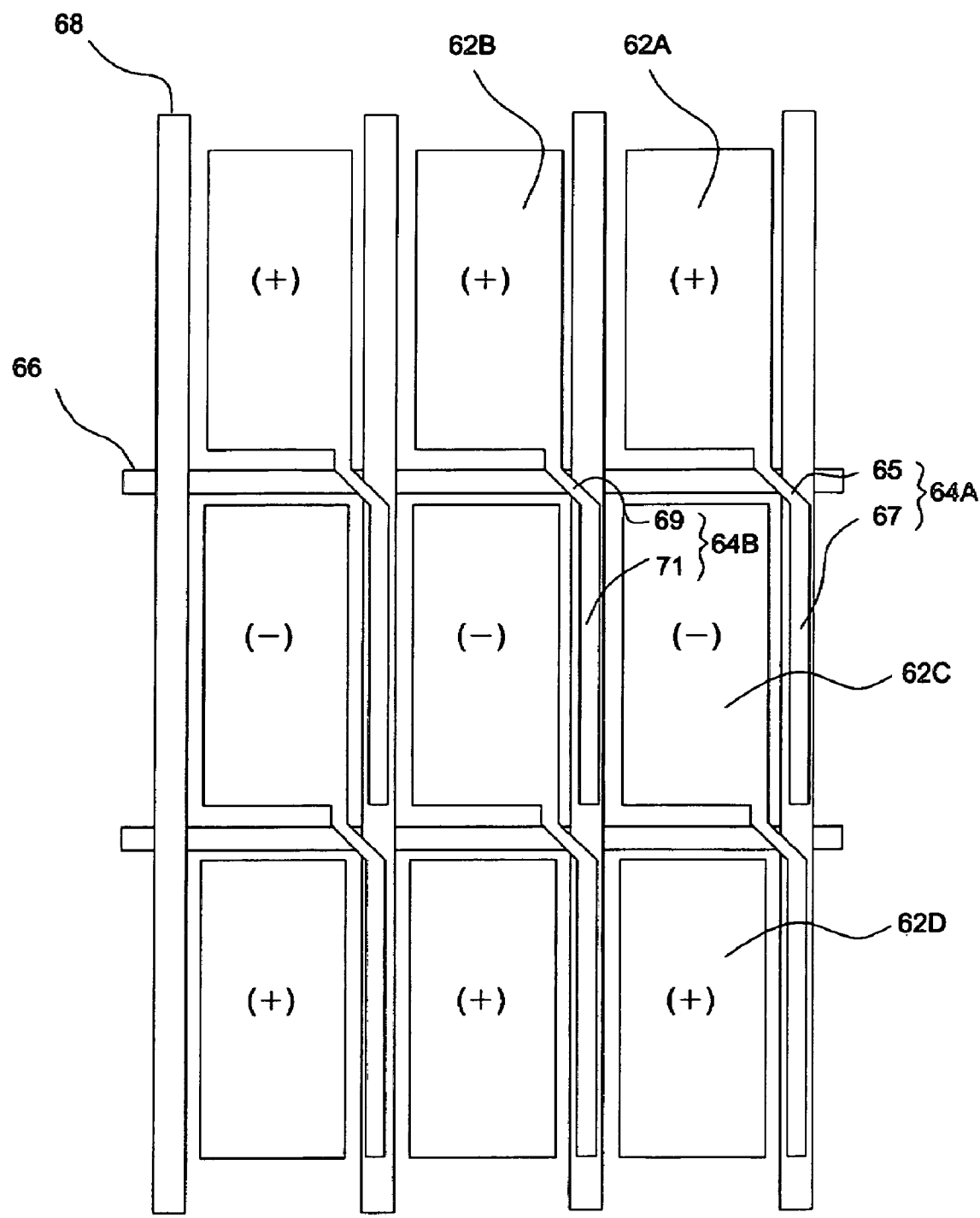
FIG. 11 shows a schematic diagram of a picture element array and a row inversion polarity pattern illustrating another embodiment of the invention.

FIG. 11 shows a schematic diagram of a picture element array and a row inversion polarity pattern illustrating another embodiment of the invention. Referring to FIG. 11, an auxiliary electrode 64A includes a strip-shape section 67 positioned next to one side of a negative-polarity picture element 62C and a strip-shape section 65 that diagonally connects the auxiliary electrode 64A with a positive-polarity picture element 62A. Also, another auxiliary electrode 64B includes a strip-shape section 71 positioned next to one side of the negative-polarity picture element 62C and a strip-shape section 69 that diagonally connects the auxiliary electrode 64B with a positive-polarity picture element 62B. Hence, the negative-polarity picture element 62C is partially surrounded by the positive-polarity strip-shape section 67 and strip-shape section 71 to produce fringe fields. Therefore, according to the invention, it is seen the auxiliary electrode 64 is not required to be placed next to all the four sides of a picture element, and fringe fields are produced only as an auxiliary electrode is positioned next to at least one side of a picture element. Also, each picture element 62 is not limited to be surrounded by the same auxiliary electrode 64, and it may be surrounded by different auxiliary electrodes that belong to their respective picture elements.

Though the connection part and the surrounding part of the auxiliary electrode 64 are exemplified as strip-shape sections in above embodiment, the shape, propagation, and position of the connection part and the surrounding part of the auxiliary electrode 64 are not limited, only as they are able to provide a polarity opposite to the picture element they at least partially surround.

In addition, when the same transparent conductive film forms the auxiliary electrodes 64 and the pixel electrodes 62, each of the auxiliary electrodes 64 is regarded as an extension part extending from each of the corresponding pixel electrodes 62. For example, each of the auxiliary electrode 64A is regarded as a first extension part extending from the pixel electrodes 62A and each of the auxiliary electrode 64B is regarded as a second extension part extending from the pixel electrodes 62B. Every extension part has the same function as the pixel electrodes 62 and contributes to increase the aperture ratio.

Figure 12:
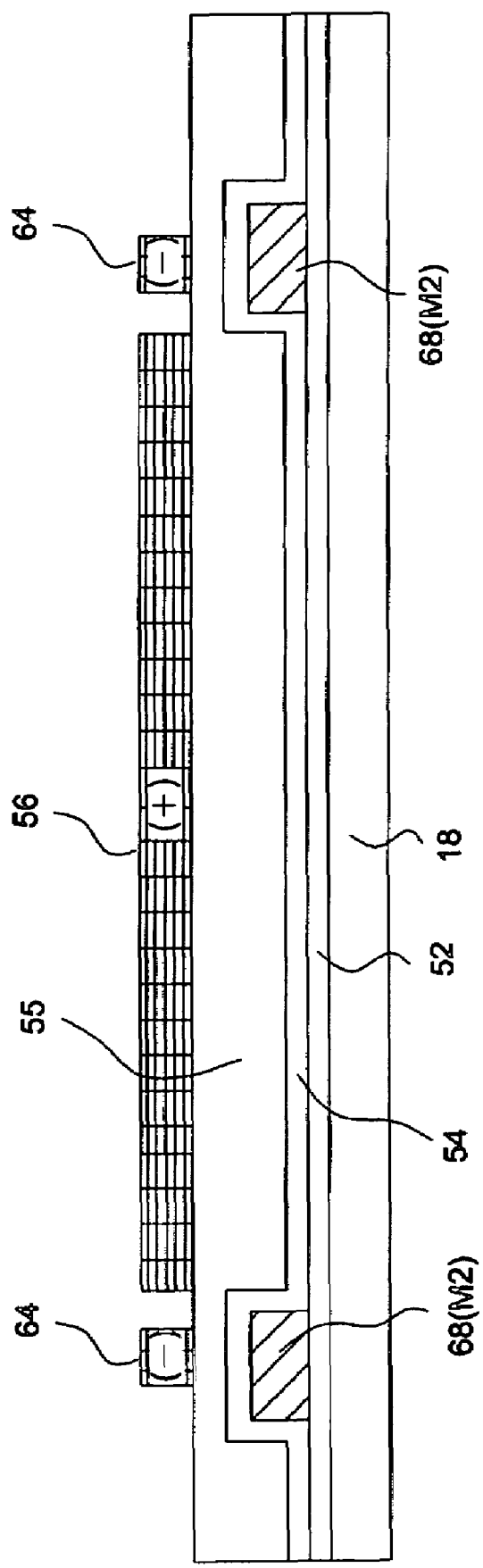
FIG. 12 shows a cross-section illustrating another embodiment of the invention.

FIG. 12 shows a cross-section illustrating another embodiment of the invention. Referring to FIG. 12, during the fabrication processes of a multi-domain LCD, a flattened dielectric layer 55 is additionally formed on the passivation layer 54, and the pixel electrode 56 and the auxiliary electrode 64 are formed on the flattened dielectric layer 55. Consequently, the formation level of the pixel electrode 56 is raised to allow for more spread areas and thus to improve the aperture ratio of the multi-domain LCD. Certainly, the passivation layer 54 may be omitted when the flattened dielectric layer 55 is provided.

Figure 13A:
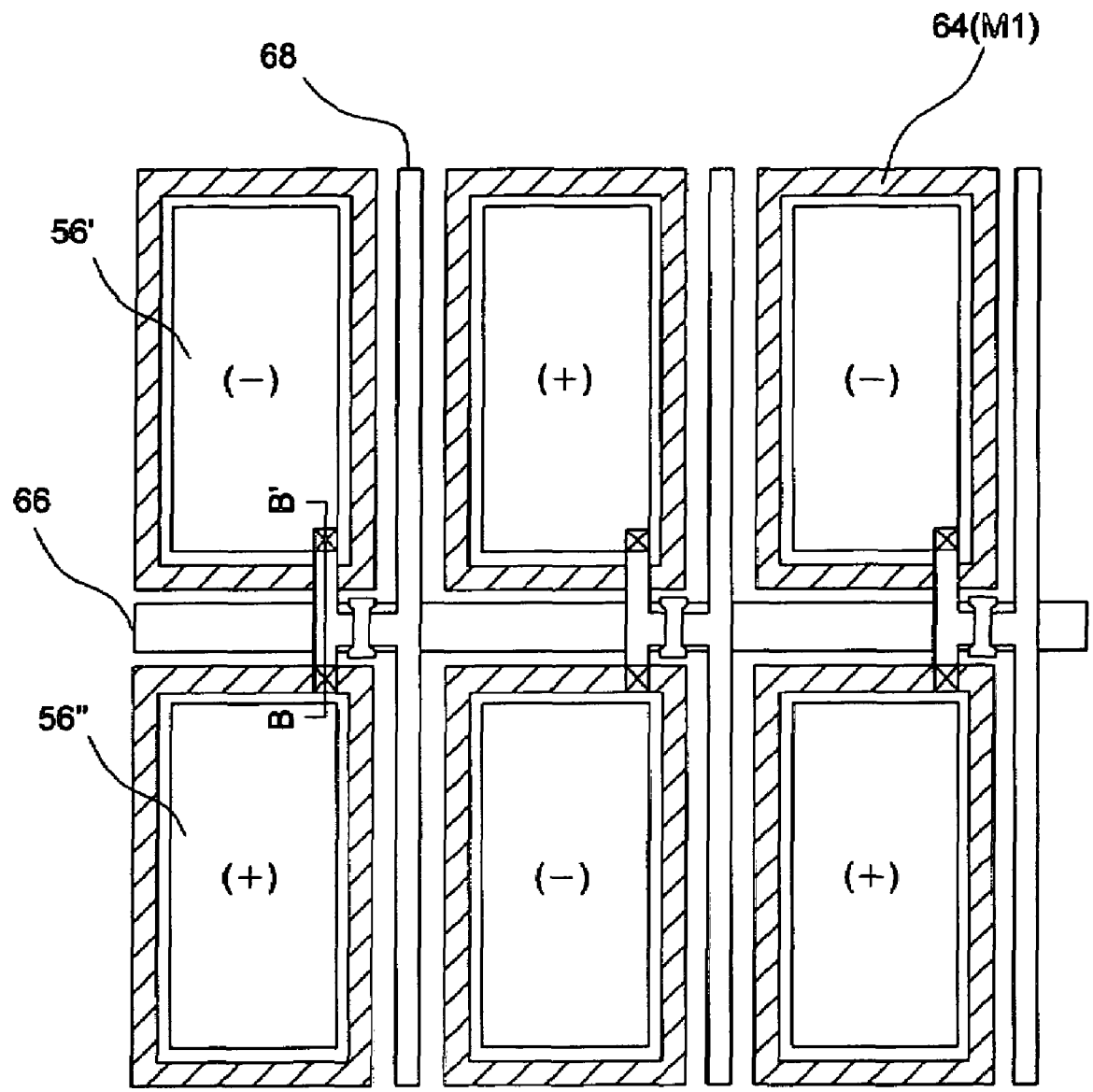
FIGS. 13A and 13B show schematic diagrams illustrating another embodiment of a multi-domain LCD according to the invention.
Figure 13B:
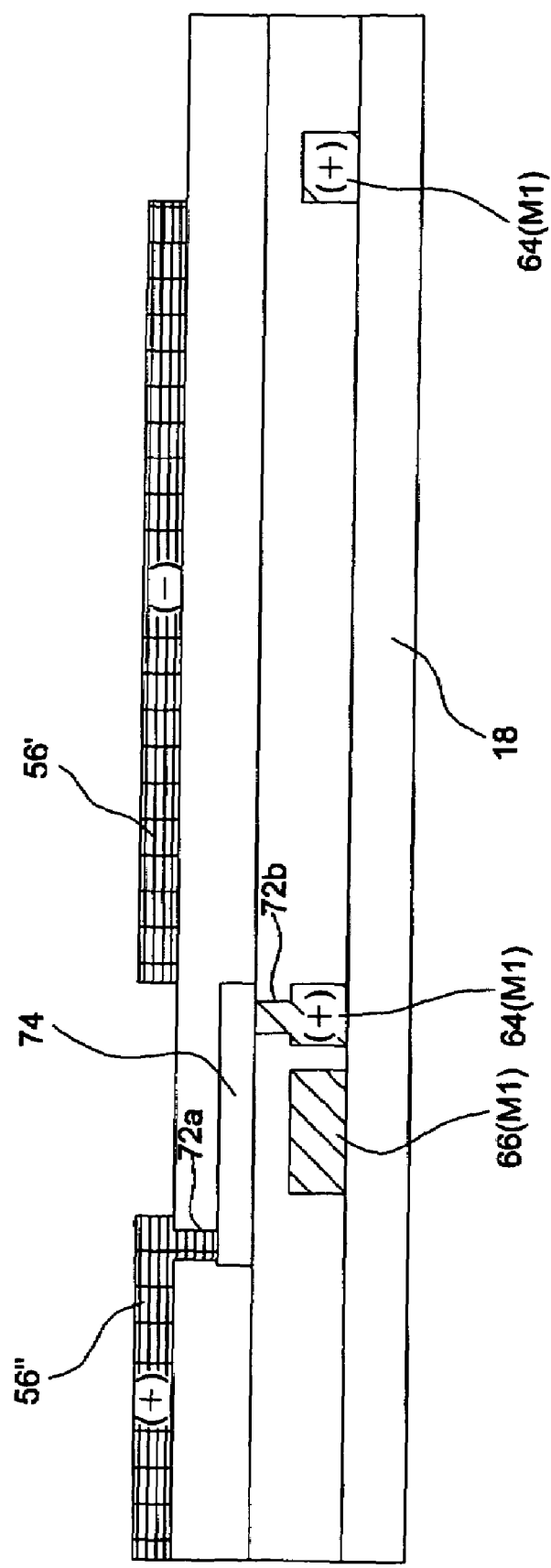

FIGS. 13A and 13B show schematic diagrams illustrating another embodiment of a multi-domain LCD according to the invention, where FIG. 13A is a top view observed from the normal direction of an array substrate, and FIG. 13B is a cross-section taken along B-B' line in FIG. 13A. Referring to FIG. 13A, the auxiliary electrode 64 is formed from a metal 1 layer M1 on which scan lines 66 are defined. In the distribution area of a picture element, the pixel electrode and the auxiliary electrode formed from a metal 1 layer have opposite polarities to produce fringe fields. As exemplified in FIG. 13B, through a contact hole 72b the auxiliary electrode 64 formed from the metal 1 layer is connected to a TFT source/drain region 74 to which a positive-polarity pixel electrode 56" is connected through a via hole 72a. Hence, the positive-polarity auxiliary electrode 64 together with the negative-polarity pixel electrode 56' it surrounds produce fringe fields.

Figure 14A:
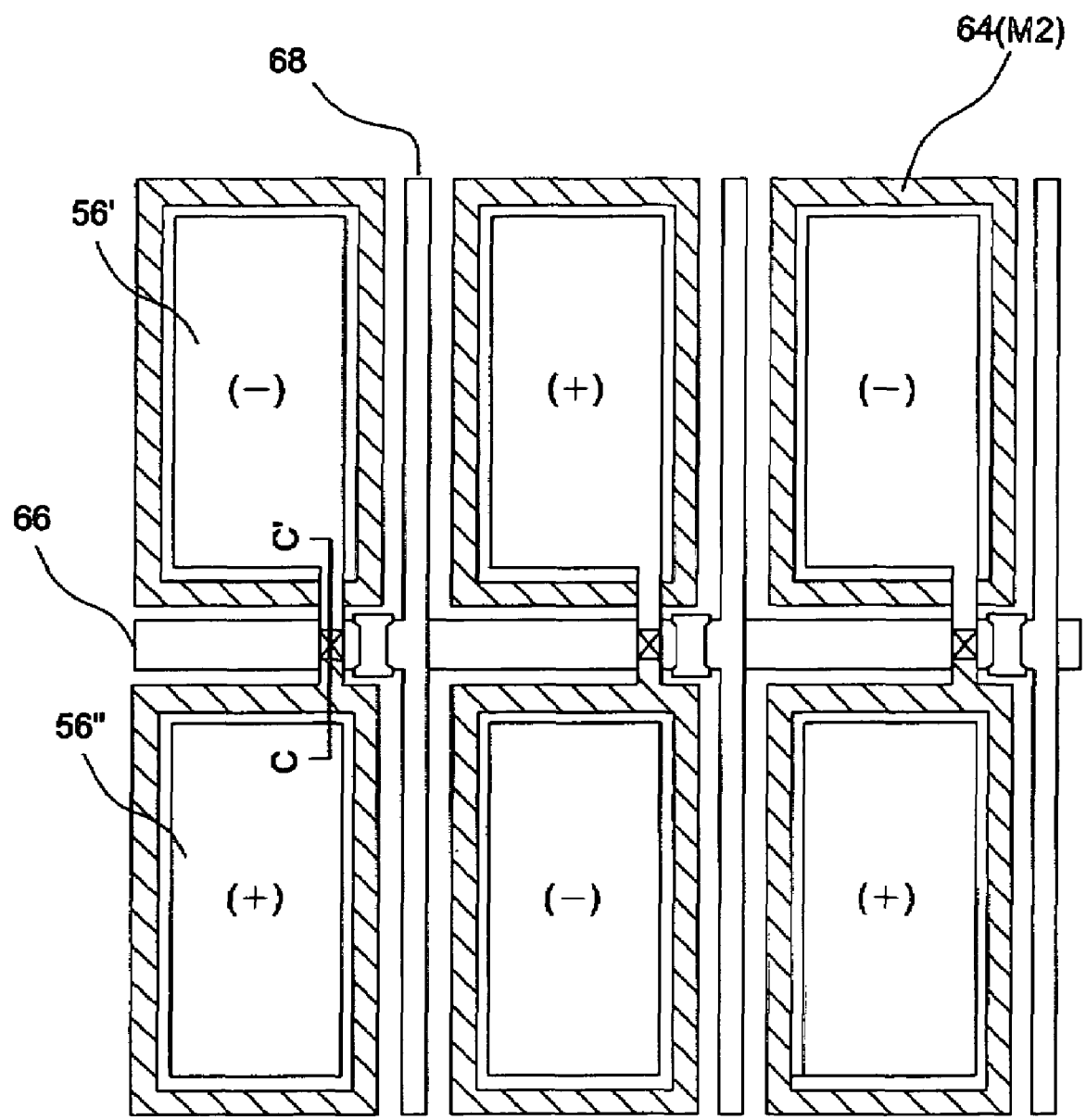
FIGS. 14A and 14B show schematic diagrams illustrating another embodiment of a multi-domain LCD according to the invention.
Figure 14B:
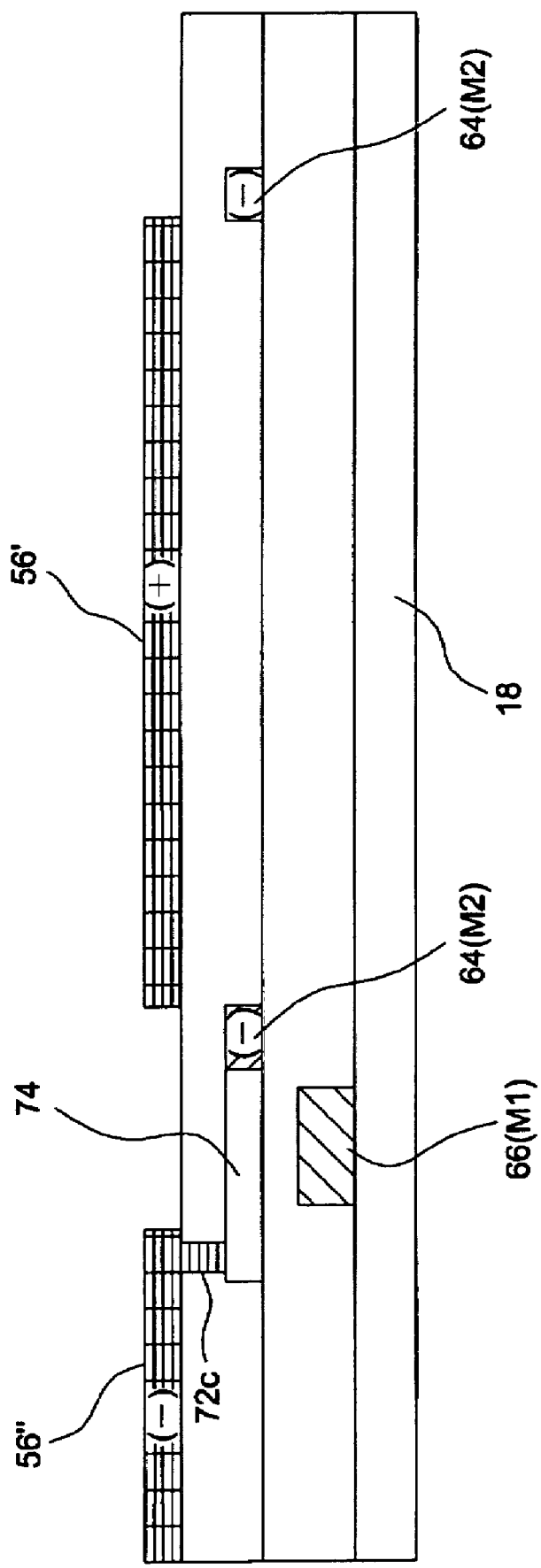

FIGS. 14A and 14B show schematic diagrams illustrating another embodiment of a multi-domain LCD according to the invention, where FIG. 14A is a top view observed from the normal direction of an array substrate, and FIG. 14B is a cross-section taken along C-C' line in FIG. 14A. Referring to FIG. 14A, the auxiliary electrode 64 is formed from a metal 2 layer M2 on which data lines 68 (not shown) are defined. In the distribution area of a picture element, the pixel electrode and the auxiliary electrode formed from the metal 2 layer have opposite polarities to produce fringe fields. As exemplified in FIG. 14B, the auxiliary electrode 64 formed from metal 2 layer is in contact with a TFT source/drain region 74 to which a negative-polarity pixel electrode 56" is connected through a via hole 72c. Hence, the negative-polarity auxiliary electrode 64 together with the positive-polarity pixel electrode 56' it surrounds produce fringe fields.

Through the above embodiments, it is clearly seen the auxiliary electrode 64 only has to at least partially surround the pixel electrode 56 to produce fringe fields, and its formation is not limited. Further, no matter how the auxiliary electrode 64 is formed, such as formed from the same layer of the pixel electrode, the metal 1 layer or the metal 2 layer, the dot inversion, column inversion and row inversion drive scheme are all can be used.

Figure 15:
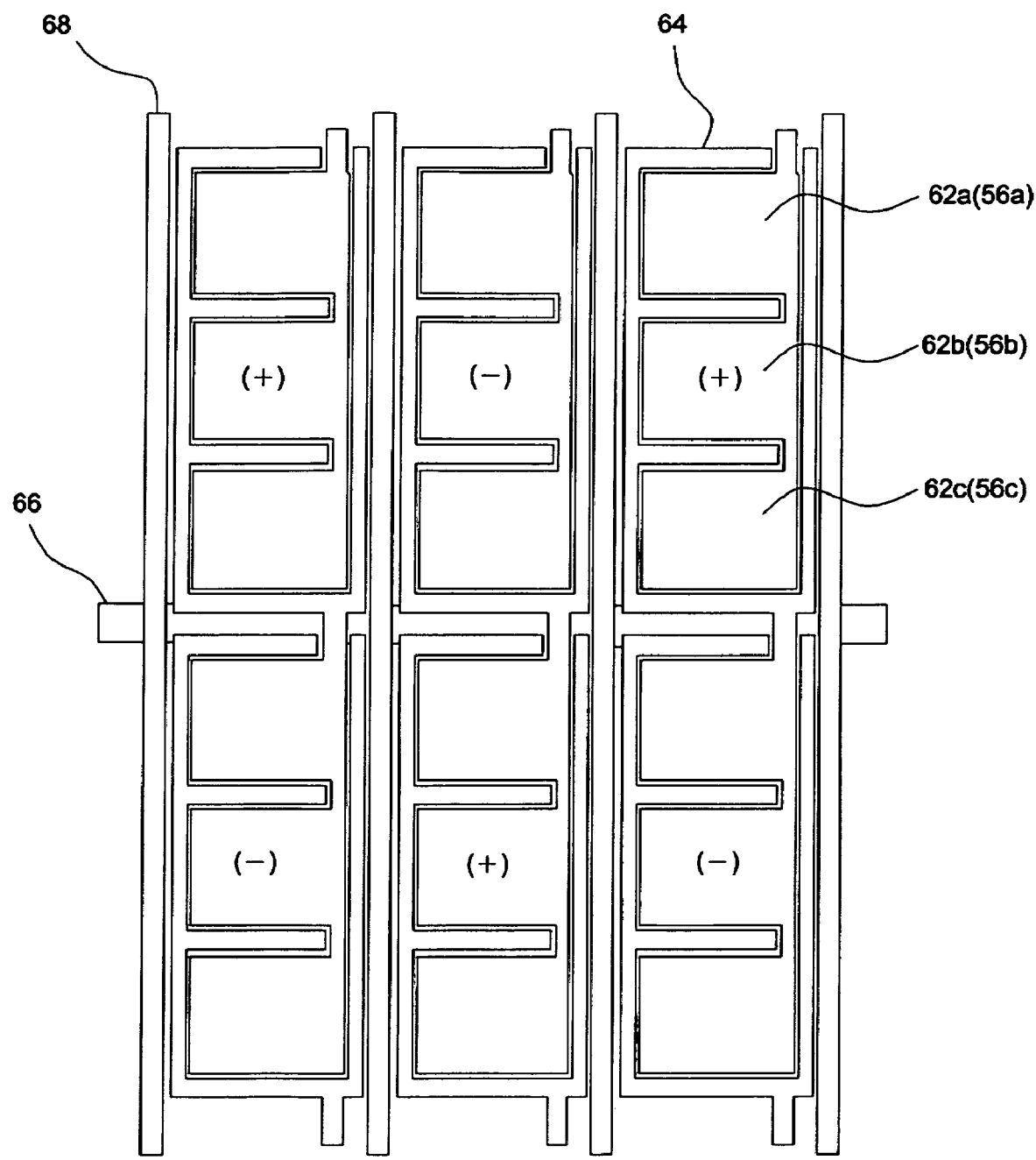
FIG. 15 shows a schematic diagram of a picture element array and a dot inversion polarity pattern illustrating another embodiment of the invention.
Figure 16:
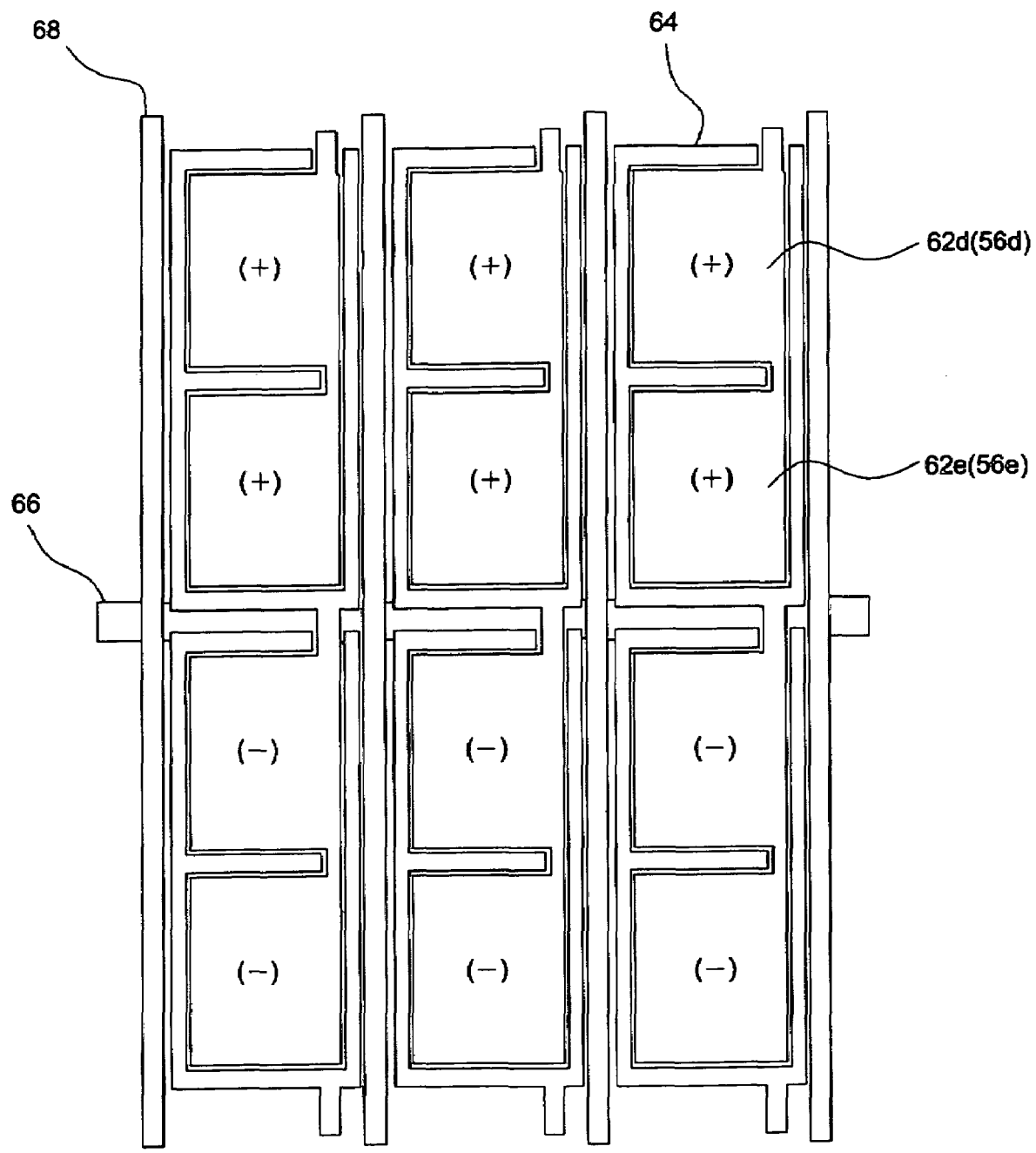
FIG. 16 shows a schematic diagram of a picture element array and a row inversion polarity pattern illustrating another embodiment of the invention.

FIG. 15 shows a schematic diagram of a picture element array and a dot inversion polarity pattern illustrating another embodiment of the invention. Referring to FIG. 15, each picture element 62 is divided into three sub picture elements 62a, 62b, and 62c. Specifically, the pixel electrode 56 in each picture element 62 is divided by the auxiliary electrode 64 into three rectangular segments 56a, 56b and 56c, and each segment of the pixel electrode 56 is surrounded by the auxiliary electrode 64 to produce fringe fields, so that the orientations of liquid crystal molecules within one rectangular segment are divided into four tilt directions. Alternatively, each picture element 62 may be divided by the auxiliary electrode 64 into two sub picture elements 62d and 62e, as shown in FIG. 16. Though the response speed of liquid crystal molecules is elevated as the number of the segments with respect to each picture element is increased, such segmentation is not limited and is determined according to the actual demand.

Further, the segmentation on each picture element is also suitable for a picture element array having a row inversion polarity pattern shown in FIG. 16 or a column inversion polarity pattern.

Figure 17:
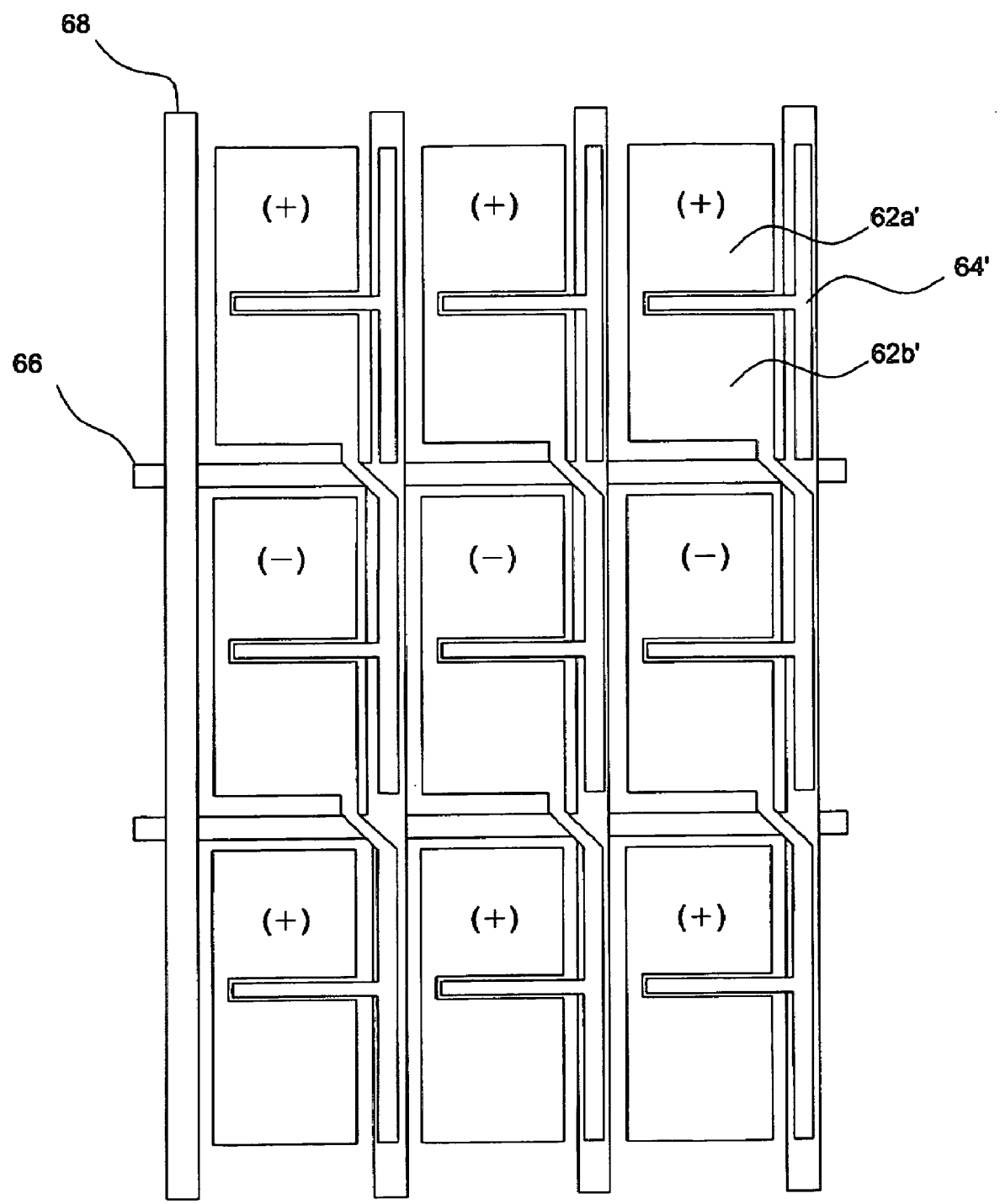
FIG. 17 shows a schematic diagram of a picture element array and a row inversion polarity pattern illustrating another embodiment of the invention.
Figure 18:
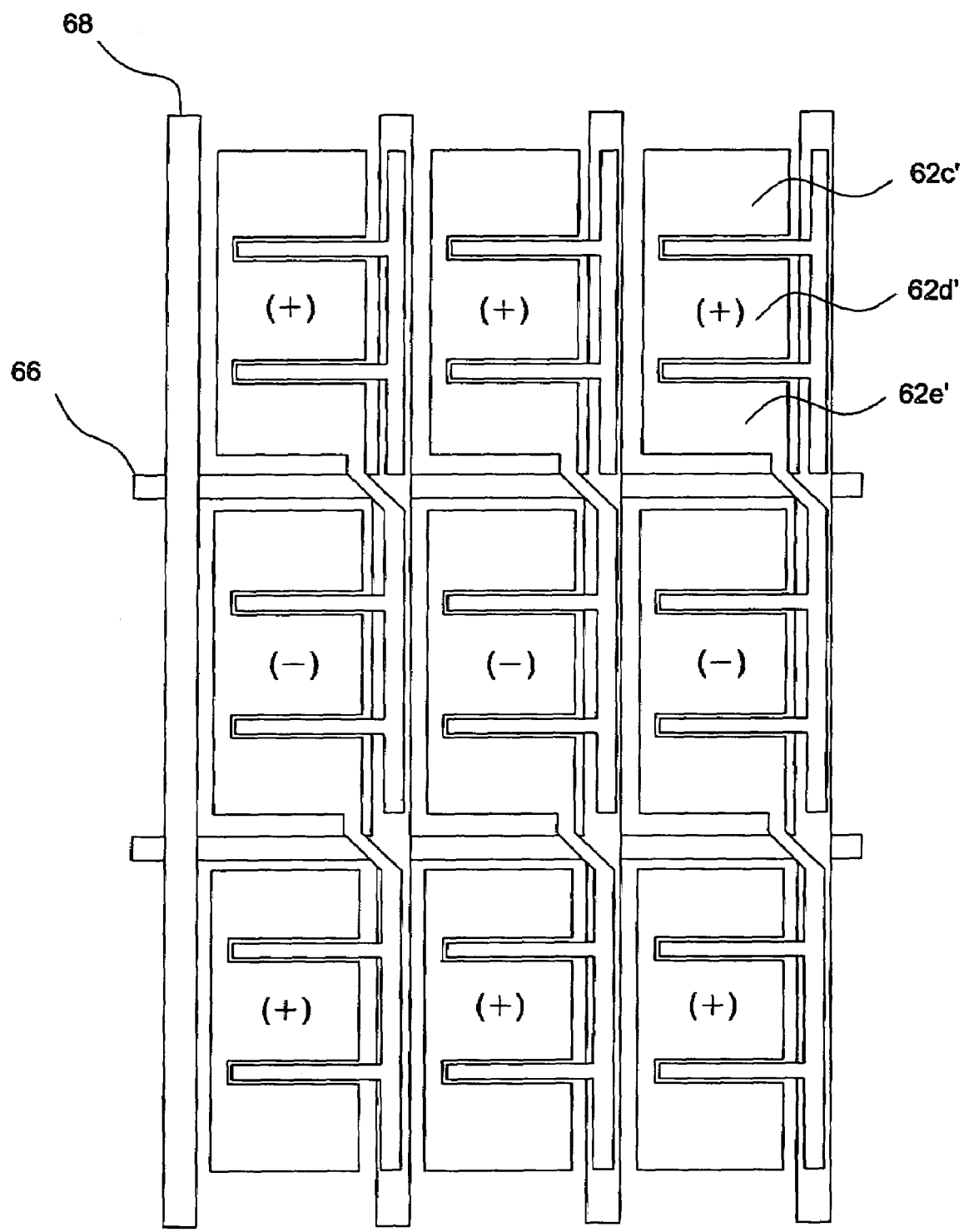
FIG. 18 shows a schematic diagram of a picture element array and a row inversion polarity pattern illustrating another embodiment of the invention.
Figure 19:
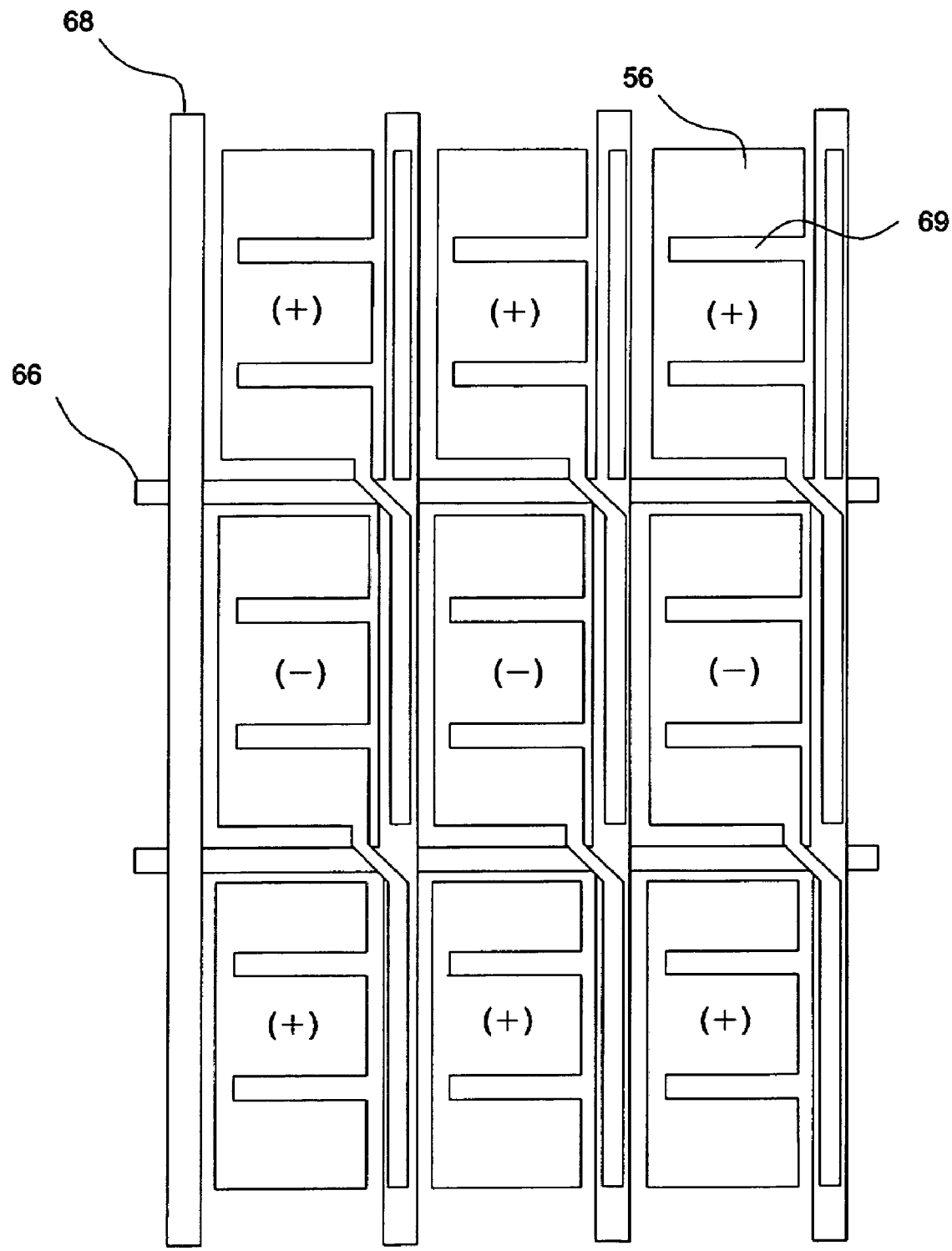
FIG. 19 shows a schematic diagram of a picture element array and a row inversion polarity pattern illustrating another embodiment of the invention.
Figure 20:
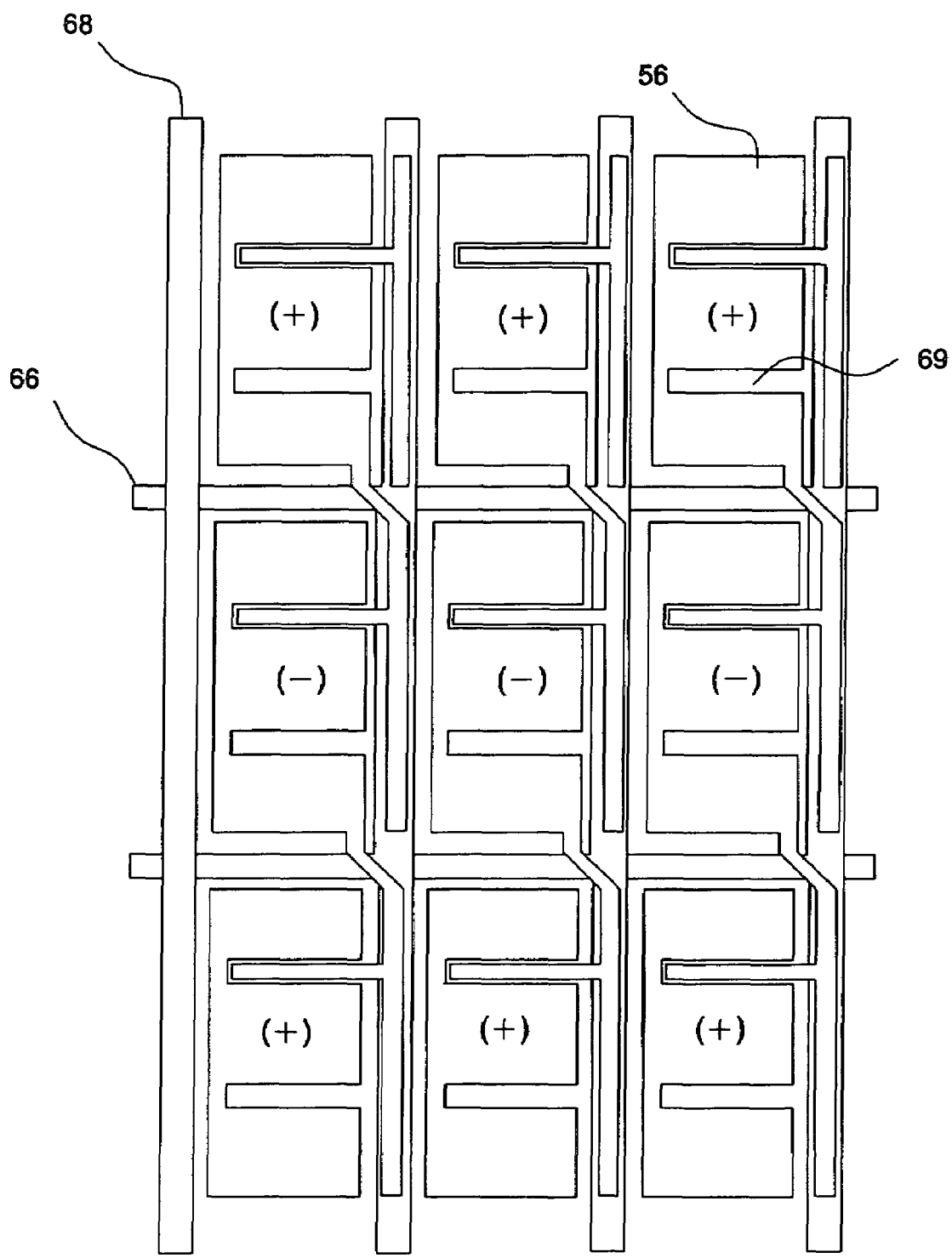
FIG. 20 shows a schematic diagram of a picture element array and a row inversion polarity pattern illustrating another embodiment of the invention.
Figure 21:
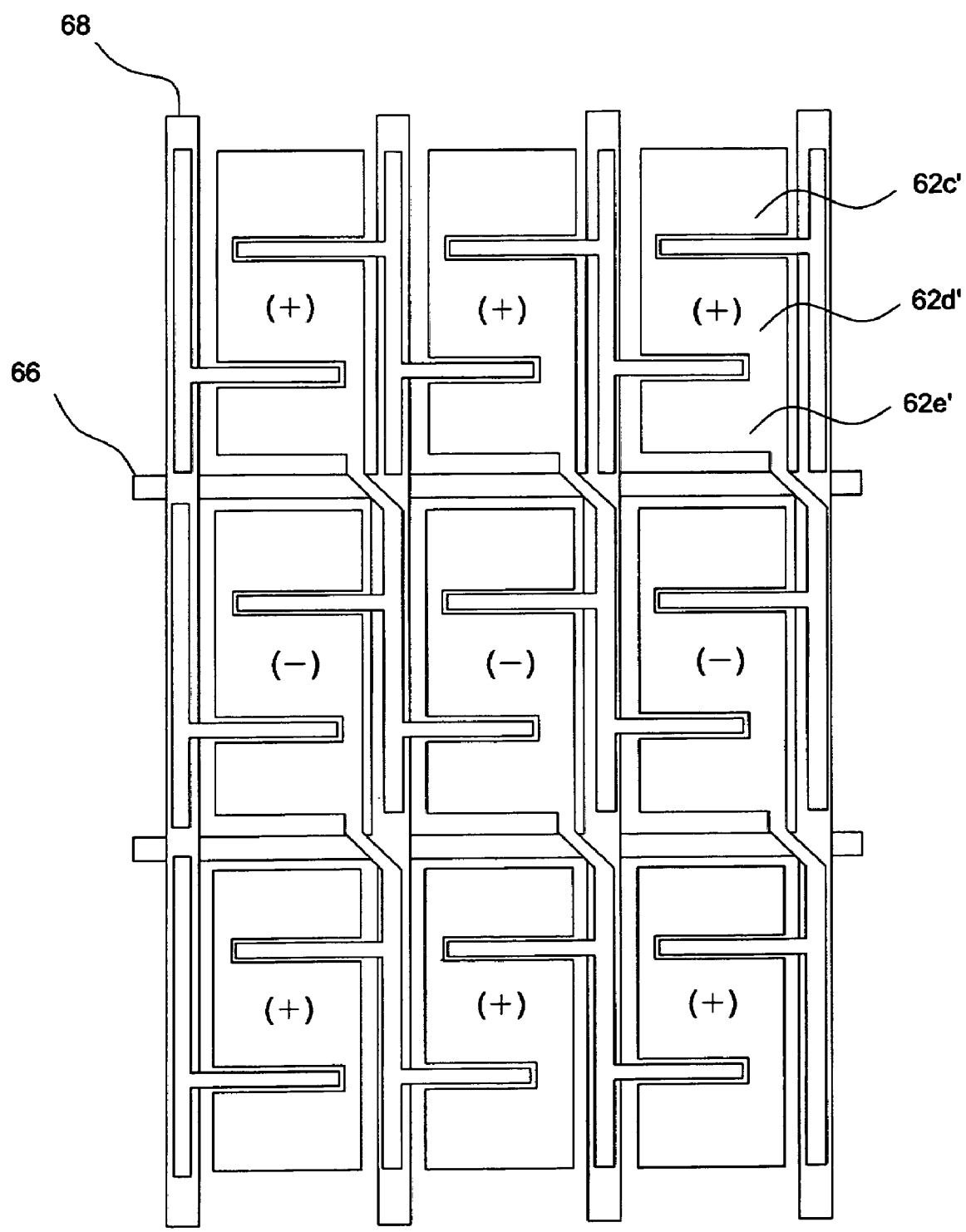
FIG. 21 shows a schematic diagram of a picture element array and a row inversion polarity pattern illustrating another embodiment of the invention.
Figure 22:
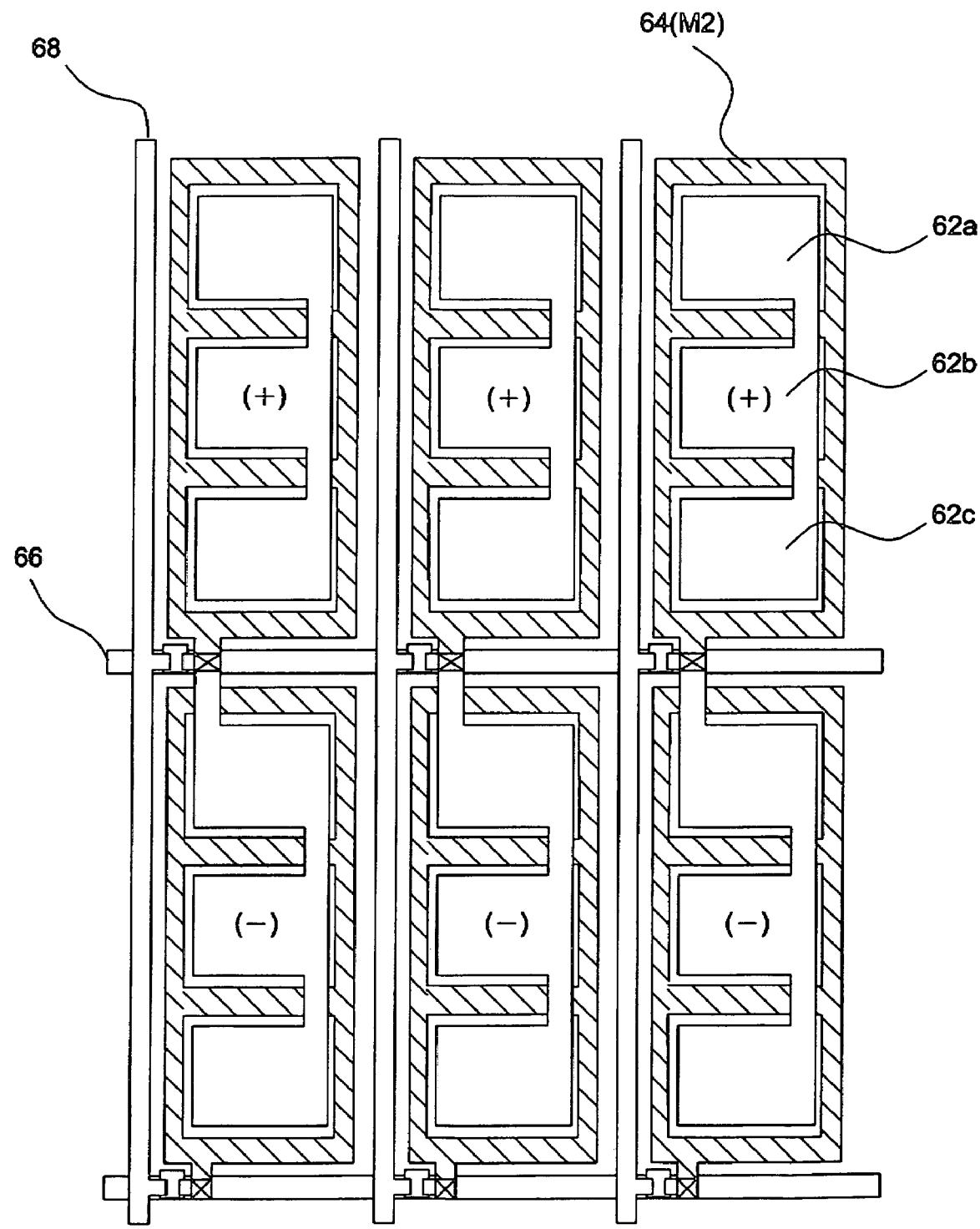
FIG. 22 shows a schematic diagram of a picture element array and a row inversion polarity pattern illustrating another embodiment of the invention.
Figure 23:
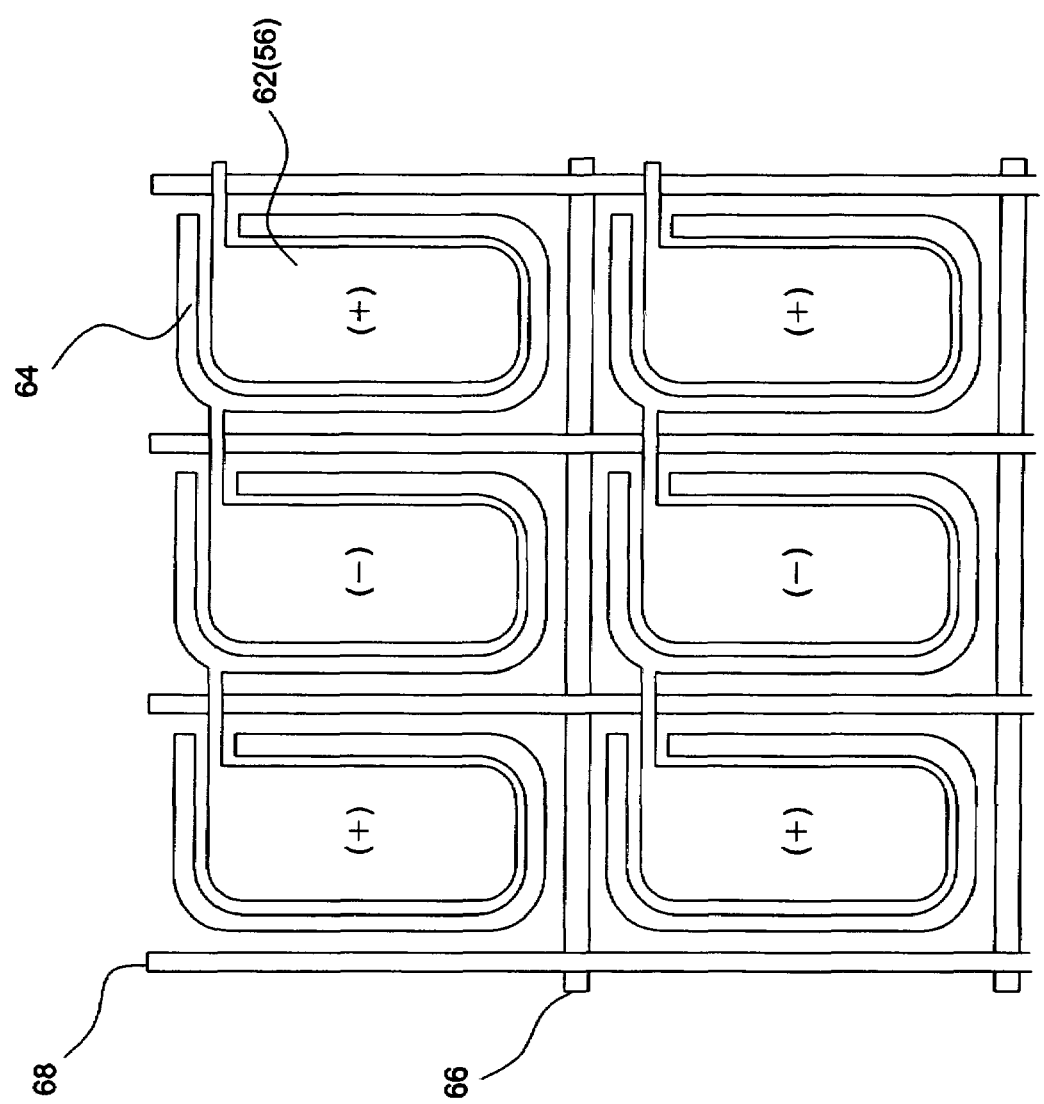
FIG. 23 shows a schematic diagram of a picture element array illustrating another embodiment of the invention.
Figure 24:
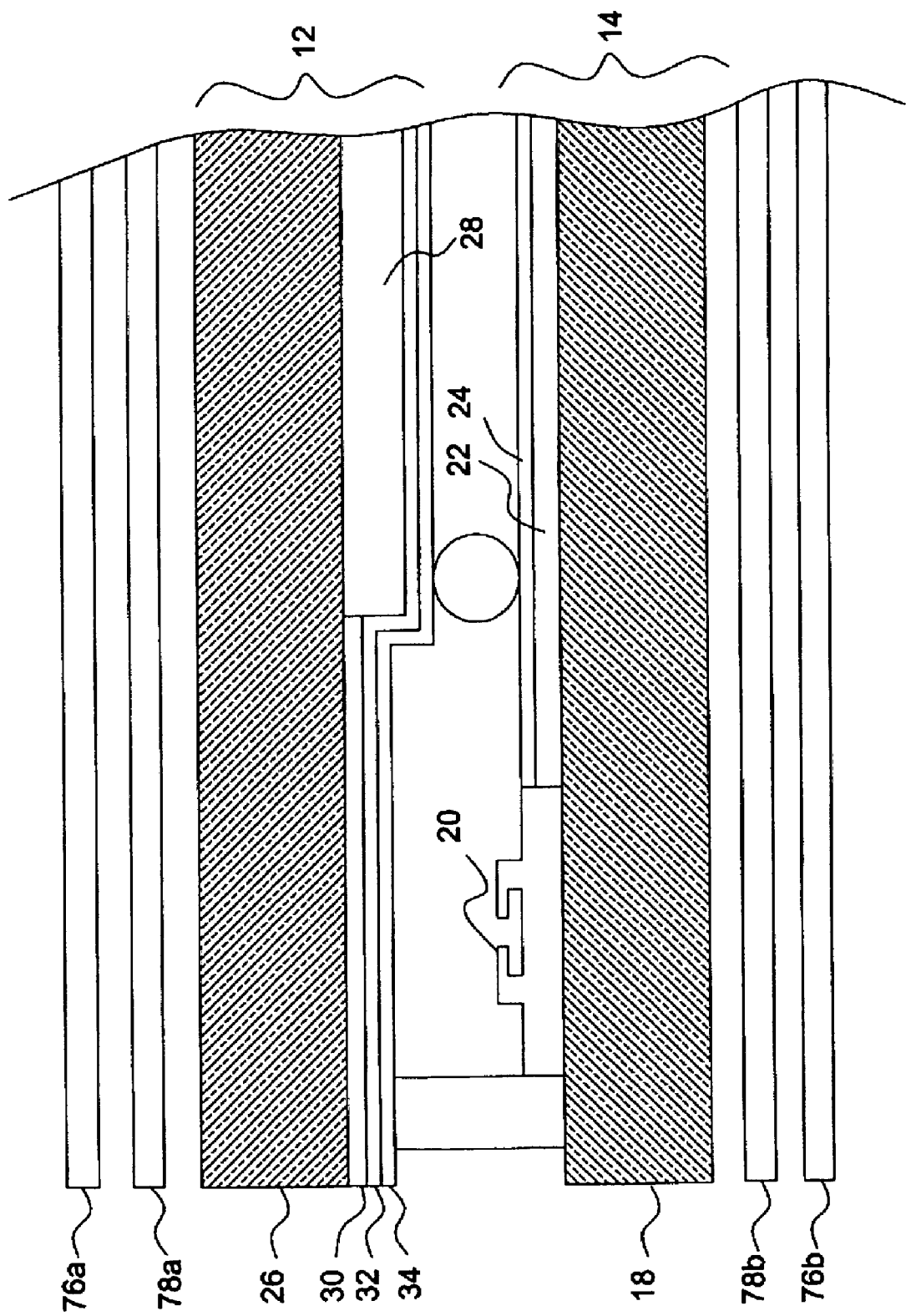
FIG. 24 shows a schematic diagram illustrating another embodiment of a multi-domain LCD according to the invention.

FIG. 17 shows a schematic diagram of a picture element array and a row inversion polarity pattern illustrating another embodiment of the invention. Referring to FIG. 17, each picture element 62' that is partially surrounded by an auxiliary electrode 64' is divided into two sub picture element 62a' and 62b' by the auxiliary electrode 64'. Alternatively, each picture element 62' may be divided into three sub picture element 62c', 62d', and 62e' by the auxiliary electrode 64' as shown in FIG. 18, and each picture element 62' may be divided only by openings 69 formed on the pixel electrode 56 such as shown in FIG. 19 and FIG. 20. Further, the sections of the auxiliary electrode 64' for division in one picture element may be all connected to the same adjacent picture element as shown in FIG. 18, or connected to different adjacent picture elements as shown in FIG. 21.

Further, under the segmentation on each picture element, the formation of the auxiliary electrode is also not limited. For example, the auxiliary electrode 64 may be formed from the same layer of the pixel electrode shown in FIG. 15, the metal 2 layer shown in FIG. 18, or the metal 1 layer.

In addition, when the same transparent conductive films form the auxiliary electrodes 64' and the pixel electrodes 62, each of the auxiliary electrodes 64' is regarded as the extension part extending from each of the corresponding pixel electrodes 62. Every extension part has the same function as the pixel electrodes 62 and contributes to increase the aperture ratio.

Moreover, the shapes of the pixel electrode and its surrounding auxiliary electrode 64 are not limited. For example, as shown in FIG. 19, they may have arc-shaped corners to aid in uniformity of light transmittance in case of using an additive of chiral dopant.

Besides, as shown in FIG. 20, a pair of quarter wave plates 78a and 78b are respectively provided between the transparent substrate 26 and a polarizer 76a and between the transparent substrate 18 and a polarizer 76b, so that a linear polarized liquid crystal cell is transformed into a circular polarized liquid crystal cell to improve light transmittance of the multi-domain LCD.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. For example, each of the first and second picture elements may be surrounded by four picture elements with opposite polarities in the diagonal direction and by two picture elements with same polarities in the row or the column direction. Therefore, the scope of the appended claims should be accorded the broadest interpretation so as to encompass all such modifications and similar arrangements.

What is claimed is:

1. A multi-domain liquid crystal display, comprising:
a plurality of first picture elements and a plurality of second picture elements having opposite polarities under the same frame of an inversion drive scheme;
a plurality of first auxiliary electrodes connected to the first picture elements and at least partially surrounding each of the second picture elements; and
a plurality of second auxiliary electrodes connected to the second picture elements and at least partially surrounding each of the first picture elements.

2. The multi-domain liquid crystal display as claimed in claim 1, wherein the inversion drive scheme is a dot-inversion, a column inversion, or a row inversion drive scheme.

3. The multi-domain liquid crystal display as claimed in claim 1, wherein the picture element is a red, a blue, or a green sub-pixel.

4. The multi-domain liquid crystal display as claimed in claim 1, wherein each of the auxiliary electrodes comprises a plurality of strip-shape sections.

5. The multi-domain liquid crystal display as claimed in claim 1, wherein the first and the second picture elements are alternatively arranged to form a picture element array where a row direction is defined, and the first and the second auxiliary electrodes are respectively connected to the first and the second picture element in the row direction of the picture element array.

6. The multi-domain liquid crystal display as claimed in claim 1, wherein the first and the second picture elements are alternatively arranged to form a picture element array where a column direction is defined, and the first and the second auxiliary electrodes are respectively connected to the first and the second picture element in the column direction of the picture element array.

7. The multi-domain liquid crystal display as claimed in claim 1, wherein the first and the second picture elements are alternatively arranged to form a picture element array where a diagonal direction is defined, and the first and the second auxiliary electrodes are respectively connected to the first and the second picture element in the diagonal direction of the picture element array.

8. The multi-domain liquid crystal display as claimed in claim 7, wherein each of the first and second picture elements is surrounded by four picture elements with opposite polarities in the diagonal direction.

9. The multi-domain liquid crystal display as claimed in claim 1, wherein each of the first auxiliary electrodes is connected to a corresponding single first picture element, and each of the second auxiliary electrodes is connected to a corresponding single second picture element.

10. The multi-domain liquid crystal display as claimed in claim 1, wherein each of the first and the second picture elements is at least partially surrounded by two different auxiliary electrodes.

11. The multi-domain liquid crystal display as claimed in claim 1, wherein each of the first and the second picture elements is at least partially surrounded by a single auxiliary electrode.

12. The multi-domain liquid crystal display as claimed in claim 1, wherein each of the auxiliary electrodes comprises a surrounding part and a connection part connected to the surrounding part, the surrounding part being positioned next to at least one side of each of the picture elements, each picture element surrounded by the auxiliary electrode being adjacent to the picture element connected by the auxiliary electrode in a row, a column or a diagonal direction.

13. The multi-domain liquid crystal display as claimed in claim 1, wherein each of the picture elements is divided into multiple sub picture elements, and each sub picture element is at least partially surrounded by the auxiliary electrode.

14. A multi-domain liquid crystal display, comprising:
a plurality of first picture elements and a plurality of second picture elements having opposite polarities under the same frame of an inversion drive scheme;
a plurality of first auxiliary electrodes connected to the first picture elements, each first auxiliary electrode being positioned next to at least one side of each second picture element; and a plurality of second auxiliary electrodes connected to the second picture elements, each second auxiliary electrode being positioned next to at least one side of each first picture element.

15. The multi-domain liquid crystal as claimed in claim 14, wherein the inversion drive scheme is a dot-inversion, a column inversion, or a row inversion drive scheme.

16. The multi-domain liquid crystal as claimed in claim 14, wherein the picture element is a red, a blue, or a green sub-pixel.

17. The multi-domain liquid crystal as claimed in claim 14, wherein each picture element is surrounded at its two opposite sides respectively by two different auxiliary electrodes.

18. The multi-domain liquid crystal as claimed in claim 14, wherein each picture element is surrounded at its all sides by a single auxiliary electrode.

19. The multi-domain liquid crystal display as claimed in claim 14, wherein each of the auxiliary electrodes comprises a surrounding part positioned next to at least one side of a picture element and a connection part that connects the surrounding part with another picture element adjacent to the picture element the auxiliary electrode surrounds.

20. The multi-domain liquid crystal display as claimed in claim 14, wherein each of the auxiliary electrodes comprises a plurality of strip-shape sections.

21. The multi-domain liquid crystal display as claimed in claim 14, wherein each of the picture elements is divided into multiple sub picture elements, and each sub picture element is at least partially surrounded by the auxiliary electrode.

22. A multi-domain liquid crystal display, comprising:
a first substrate;
a second substrate facing the first substrate;
a liquid crystal layer having negative dielectric anisotropy interposed between the first substrate and the second substrate;
a common electrode provided on the first substrate;
a plurality of first signal lines provided on the second substrate;
a first dielectric layer formed on the second substrate and covering the first signal lines;
a plurality of second signal lines provided on the first dielectric layer;
a second dielectric layer formed on the first dielectric layer and covering the second signal lines;
a plurality of pixel electrodes formed on the second dielectric layer; and
a plurality of auxiliary electrodes formed on the second substrate and at least partially surrounding each of the pixel electrode;
wherein each of the pixel electrode and the auxiliary electrode positioned next to the pixel electrode have opposite polarities when a voltage is applied across the common electrode and the pixel electrodes.

23. The multi-domain liquid crystal display as claimed in claim 22, wherein the pixel electrodes comprise first pixel electrodes and second pixel electrodes having an opposite polarity relative to the first pixel electrodes under the same frame of an inversion drive scheme.

24. The multi-domain liquid crystal display as claimed in claim 23, wherein the inversion drive scheme is a dot-inversion, a column inversion, or a row inversion drive scheme.

25. The multi-domain liquid crystal display as claimed in claim 22, wherein the auxiliary electrodes are formed on the second dielectric layer and connect to the pixel electrodes.

26. The multi-domain liquid crystal display as claimed in claim 25, wherein each of the auxiliary electrode is an extension part extending from each of the corresponding pixel electrodes.

27. The multi-domain liquid crystal display as claimed in claim 22, wherein the auxiliary electrodes and the first signal lines are formed from a metal 1 layer.

28. The multi-domain liquid crystal display as claimed in claim 27, wherein the auxiliary electrodes electrically connect to the pixel electrodes.

29. The multi-domain liquid crystal display as claimed in claim 22, wherein the auxiliary electrodes and the first signal lines are formed from a metal 2 layer.

30. The multi-domain liquid crystal display as claimed in claim 29, wherein the auxiliary electrodes electrically connect to the pixel electrodes.

31. The multi-domain liquid crystal display as claimed in claim 22, where the second dielectric layer is a flattened dielectric layer.

32. The multi-domain liquid crystal display as claimed in claim 22, wherein the auxiliary electrodes are made from transparent conductive materials or metallic materials.

33. The multi-domain liquid crystal display as claimed in claim 22, wherein the liquid crystal layer comprises an additive of chiral dopant.

34. The multi-domain liquid crystal display as claimed in claim 22, further comprising:

a first polarizer positioned next to the first substrate and opposite to the liquid crystal layer;

a second polarizer positioned next to the first substrate and opposite to the liquid crystal layer;

a first quarter wave plate provided between the first polarizer and the first substrate; and a second quarter wave plate provided between the second polarizer and the second substrate.

35. A multi-domain liquid crystal display, comprising:

a plurality of first picture elements, each of the first picture elements having at least one first extension part; and a plurality of second picture elements having an opposite polarity relative to the first picture elements under the same frame of an inversion drive scheme, each of the second picture elements having at least one second extension part;

wherein each first extension part is positioned next to at least one side of each second picture element, and each second extension part is positioned next to at least one side of each first picture element.

36. The multi-domain liquid crystal display as claimed in claim 35, wherein each of the picture elements is divided into multiple sub picture element, and each sub picture element is at least partially surrounded by the first extension part or the second extension part.

* * * * *